United States Patent
Yamazaki

(10) Patent No.: US 9,647,569 B2
(45) Date of Patent: May 9, 2017

(54) MATRIX CONVERTOR, POWER GENERATION SYSTEM, AND METHOD FOR CONVERTING POWER WITH CONTROL COMMAND GENERATION

(71) Applicant: KABUSHIKI KAISHA YASKAWA DENKI, Kitakyushu-shi (JP)

(72) Inventor: Akira Yamazaki, Kitakyushu (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 0 days.

(21) Appl. No.: 14/863,452

(22) Filed: Sep. 24, 2015

(65) Prior Publication Data

US 2016/0094140 A1   Mar. 31, 2016

(30) Foreign Application Priority Data

Sep. 25, 2014   (JP) ................. 2014-195858

(51) Int. Cl.
*H02M 5/297*   (2006.01)
*H02M 5/293*   (2006.01)
*H02M 1/12*    (2006.01)
*H02M 5/458*   (2006.01)
*H02M 5/27*    (2006.01)
*H02M 5/02*    (2006.01)

(52) U.S. Cl.
CPC .............. *H02M 5/297* (2013.01); *H02M 1/12* (2013.01); *H02M 5/02* (2013.01); *H02M 5/271* (2013.01); *H02M 5/4585* (2013.01); *H02M 2005/2932* (2013.01)

(58) Field of Classification Search
CPC ........ H02M 1/12; H02M 1/32; H02M 5/4585; H02M 5/271; H02M 5/02
See application file for complete search history.

(56) References Cited

U.S. PATENT DOCUMENTS 7,701,740 B2 * 4/2010 Yamanaka ............ H02M 5/293
                                                    363/149
2010/0118570 A1   5/2010 Hara et al.
2010/0149848 A1 * 6/2010 Urushibata ........... H02M 5/293
                                                    363/148

(Continued)

FOREIGN PATENT DOCUMENTS

WO   WO 2009/013992   1/2009

*Primary Examiner* — Jue Zhang
*Assistant Examiner* — Lakaisha Jackson
(74) *Attorney, Agent, or Firm* — Mori & Ward, LLP

(57) ABSTRACT

A matrix convertor includes a power convertor and a controller. The power convertor includes a plurality of bidirectional switches disposed between a plurality of input phases and a plurality of output phases. The controller is configured to generate a control command and control the power convertor based on the control command. The control command includes a switching pattern that causes a first input phase among the input phases to be connected to one output phase among the output phases and that causes connection of the input phases to be switched between a rest of the output phases. In generating the control command, the controller is configured to set a lower limit to a period of time during which a second input phase among the input phases that corresponds to an intermediate voltage is connected to the rest of the output phases.

16 Claims, 10 Drawing Sheets

(56) References Cited

U.S. PATENT DOCUMENTS

| | | | | |
|---|---|---|---|---|
| 2011/0043273 A1* | 2/2011 | Blasko | ............ | H02M 5/271 |
| | | | | 327/489 |
| 2014/0159698 A1* | 6/2014 | Uchino | ............ | H02M 5/297 |
| | | | | 323/311 |
| 2015/0130432 A1* | 5/2015 | Yamazaki | ............ | H02M 5/297 |
| | | | | 323/272 |
| 2015/0236603 A1* | 8/2015 | Jimichi | ............ | H02M 5/293 |
| | | | | 363/37 |
| 2015/0372610 A1* | 12/2015 | Ichiki | ............ | H02M 5/293 |
| | | | | 363/163 |
| 2016/0190970 A1* | 6/2016 | Yamazaki | ............ | H02P 27/08 |
| | | | | 318/400.29 |

\* cited by examiner

MATRIX CONVERTOR, POWER GENERATION SYSTEM, AND METHOD FOR CONVERTING POWER WITH CONTROL COMMAND GENERATION

CROSS-REFERENCE TO RELATED APPLICATIONS

The present application claims priority under 35 U.S.C. §119 to Japanese Patent Application No. 2014-195858, filed Sep. 25, 2014. The contents of this application are incorporated herein by reference in their entirety.

BACKGROUND

Field of the Invention

The embodiments disclosed herein relate to a matrix convertor, a power generation system, and a method for converting power.

Discussion of the Background

WO 2009/013992 discloses a matrix convertor including a plurality of bidirectional switches to connect input phases to respective output phases. The matrix convertor controls the bidirectional switches to directly switch between the voltages of the input phases so as to output desired voltages and desired frequencies to the output phases. When the matrix convertor is connected between a power system and a power generator, the input phases are, for example, the R phase, the S phase, and the T phase of the power system, and the output phases are, for example, the U phase, the V phase, and the W phase of the power generator.

In the matrix convertor, one of the output phases is connected to one of the input phases, and the rest of the plurality of output phases are subjected to PWM modulation using all the three input phases. This technique is conventionally known as two-phase modulation.

SUMMARY

According to one aspect of the present disclosure, a matrix convertor includes a power convertor and a controller. The power convertor includes a plurality of bidirectional switches disposed between a plurality of input phases and a plurality of output phases. The controller is configured to generate a control command and control the power convertor based on the control command. The control command includes a switching pattern that causes a first input phase among the plurality of input phases to be connected to one output phase among the plurality of output phases and that causes connection of the plurality of input phases to be switched between a rest of the plurality of output phases. In generating the control command, the controller is configured to set a lower limit to a period of time during which a second input phase among the plurality of input phases that corresponds to an intermediate voltage is connected to the rest of the plurality of output phases.

According to another aspect of the present disclosure, a power generation system includes a power generator and a matrix convertor. The power generator is configured to generate power. The matrix convertor is connected to the power generator to output the power to a power system. The matrix convertor includes a power convertor and a controller. The power convertor includes a plurality of bidirectional switches disposed between a plurality of input phases and a plurality of output phases. The controller is configured to generate a control command and control the power convertor based on the control command. The control command includes a switching pattern that causes a first input phase among the plurality of input phases to be connected to one output phase among the plurality of output phases and that causes connection of the plurality of input phases to be switched between a rest of the plurality of output phases. In generating the control command, the controller is configured to set a lower limit to a period of time during which a second input phase among the plurality of input phases that corresponds to an intermediate voltage is connected to the rest of the plurality of output phases.

According to the other aspect of the present disclosure, a method for converting power includes, through a power convertor including a plurality of bidirectional switches disposed between a plurality of input phases and a plurality of output phases, generating a control command including a switching pattern that causes a first input phase among the plurality of input phases to be connected to one output phase among the plurality of output phases and that causes connection of the plurality of input phases to be switched between a rest of the plurality of output phases. The power convertor is controlled based on the control command. The generating step includes setting a lower limit to a period of time during which a second input phase among the plurality of input phases that corresponds to an intermediate voltage is connected to the rest of the plurality of output phases.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A matrix convertor, a power generation system, and a method for converting power according to embodiments will be described in detail below with reference to the accompanying drawings. The following embodiments are provided for exemplary purposes only and are not intended to limit the present disclosure.

1. Configuration of Matrix Convertor

Figure 1:
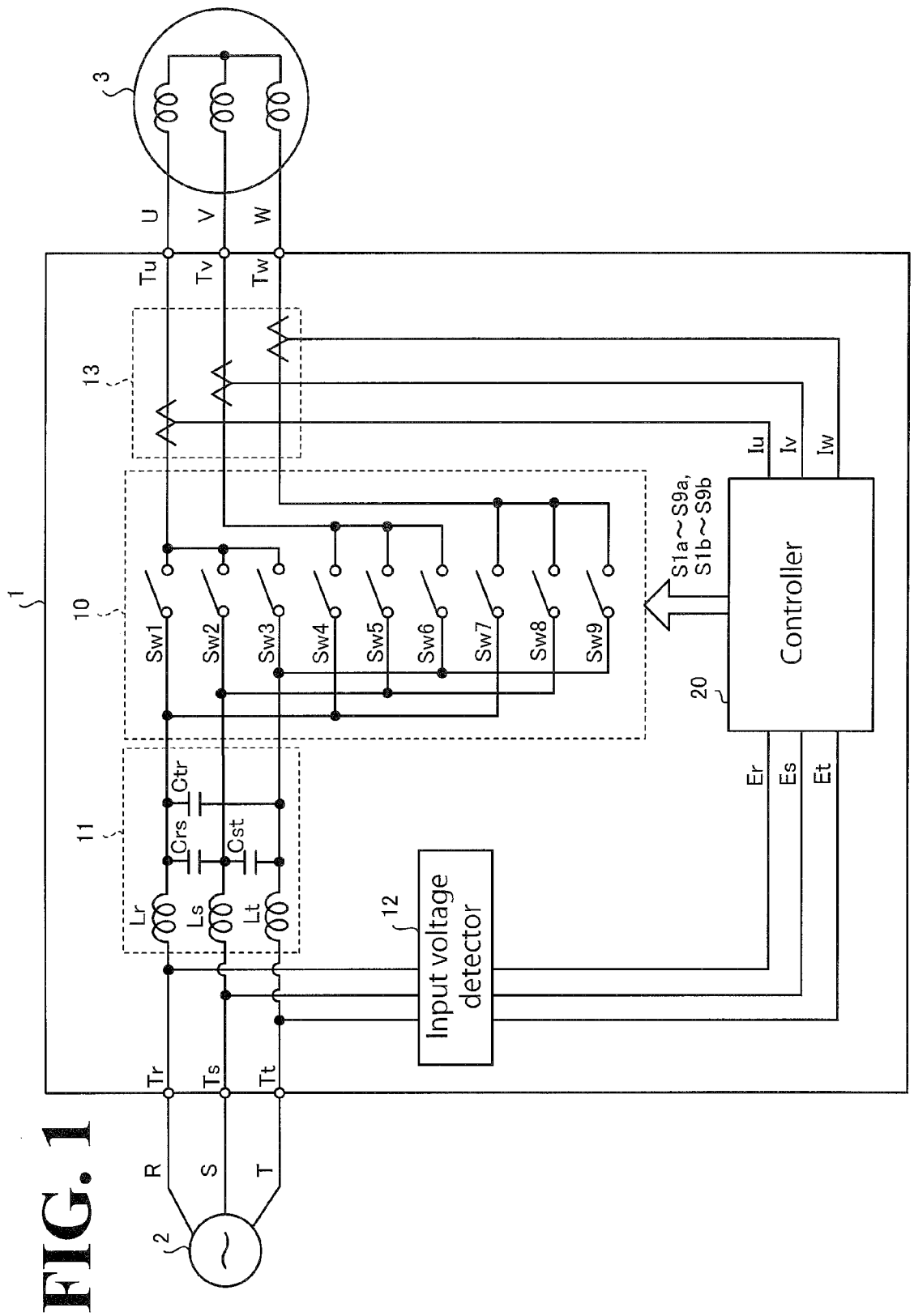
FIG. 1 is a diagram illustrating an exemplary configuration of a matrix convertor according to an embodiment.

FIG. 1 is a diagram illustrating an exemplary configuration of a matrix convertor according to an embodiment. As illustrated in FIG. 1, the matrix convertor 1 according to this embodiment is disposed between the R phase, the S phase, and the T phase (which are examples of the plurality of input phases) of a three-phase alternating-current (AC) power source 2 (hereinafter referred to as "AC power source 2") and the U phase, the V phase, and the W phase (which are examples of the output phases) of an AC device 3. A non-limiting example of the AC power source 2 is a power system. Examples of the AC device 3 include, but are not limited to, rotating electric machines such as AC motors and AC generators.

When the AC power source 2 is a power system and the AC device 3 is an AC generator (which is an example of the power generator), for example, the matrix convertor 1 outputs power generated by the AC device 3 to the AC power source 2. In this case, the matrix convertor 1 and the AC device 3 constitute a power generation system. Alternatively, when the AC power source 2 is a power system and the AC device 3 is an AC motor, the matrix convertor 1 controls the AC device 3 based on power supplied from the AC power source 2.

The matrix convertor 1 includes input terminals Tr, Ts, and Tt, output terminals Tu, Tv, and Tw, a power convertor 10, an LC filter 11, an input voltage detector 12, an output current detector 13, and a controller 20 (which is an example of the controller). A three-phase AC voltage is supplied from the AC power source 2 through the input terminals Tr, Ts, and Tt. The matrix convertor 1 converts the three-phase AC voltage into a desired voltage and frequency, and outputs the voltage and frequency to the AC device 3 through the output terminals Tu, Tv, and Tw.

The power convertor 10 includes a plurality of bidirectional switches Sw1 to Sw9 (hereinafter occasionally referred to as bidirectional switches Sw collectively). The bidirectional switches Sw1 to Sw9 connect each phase of the AC power source 2 and each phase of the AC device 3 to each other. The bidirectional switches Sw1 to Sw3 respectively connect the R phase, the S phase, and the T phase of the AC power source 2 to the U phase of the AC device 3. The bidirectional switches Sw4 to Sw6 respectively connect the R phase, the S phase, and the T phase of the AC power source 2 to the V phase of the AC device 3. The bidirectional switches Sw7 to Sw9 respectively connect the R phase, the S phase, and the T phase of the AC power source 2 to the W phase of the AC device 3.

Figure 2:
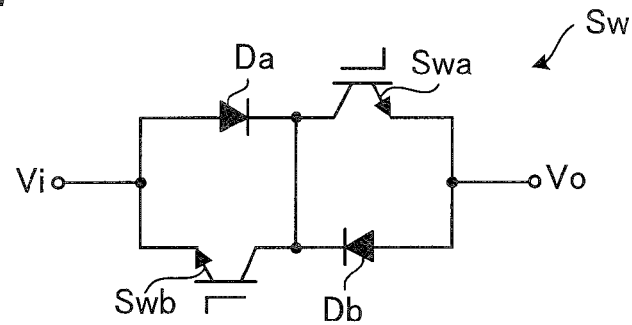
FIG. 2 is a diagram illustrating an exemplary configuration of a bidirectional switch illustrated in FIG. 1.

FIG. 2 is a diagram illustrating an exemplary configuration of the bidirectional switch Sw. As illustrated in FIG. 2, the bidirectional switch Sw includes: a series connection circuit of a switching element Swa and a diode Da; and a series connection circuit of a switching element Swb and a diode Db. These series connection circuits are oriented in opposite directions and connected in parallel to each other. In FIG. 2, input phase voltage is indicated as Vi, and output phase voltage is indicated as Vo.

The bidirectional switch Sw will not be limited to the configuration illustrated in FIG. 2; it suffices that the bidirectional switch Sw includes a plurality of switching elements and controls the conduction direction. In the example illustrated in FIG. 2, the cathodes of the diodes Da and Db are connected to each other. The bidirectional switch Sw, however, may have a configuration in which the cathodes of the diodes Da and Db are not connected to each other.

The switching elements Swa and Swb are semiconductor switching elements such as metal-oxide-semiconductor field-effect transistors (MOSFETs) and insulated gate bipolar transistors (IGBTs). Alternatively, the switching elements Swa and Swb may be next-generation semiconductor switching elements such as SiC and GaN. It is noted that when the switching elements Swa and Swb are reverse blocking IGBTs, there is no need for providing the diodes Da and Db.

Referring back to FIG. 1, the matrix convertor 1 will be further described. The LC filter 11 is disposed between the power convertor 10 and the R phase, the S phase, and the T phase of the AC power source 2. The LC filter 11 includes three reactors Lr, Ls, and Lt and three capacitors Crs, Cst, and Ctr, and removes high-frequency components caused by switching of the bidirectional switches Sw.

The input voltage detector 12 detects the voltage of each of the R phase, the S phase, and the T phase of the AC power source 2. For example, the input voltage detector 12 detects instantaneous values Er, Es, and Et of the respective voltages of the R phase, the S phase, and the T phase of the AC power source 2 (the instantaneous values will be hereinafter referred to as input phase voltages Er, Es, and Et).

The output current detector 13 detects a current flowing between the power convertor 10 and the AC device 3. For example, the output current detector 13 detects instantaneous values Iu, Iv, and Iw of currents respectively flowing between the power convertor 10 and the U phase, the V phase, and the W phase of the AC device 3 (hereinafter referred to as output phase currents Iu, Iv, and Iw). In the following description, the output phase currents Iu, Iv, and Iw will be occasionally referred to as output phase currents Io collectively.

Based on values including the input phase voltages Er, Es, and Et and the output phase currents Iu, Iv, and Iw, the controller 20 generates drive signals S1a to S9a and S1b to S9b (hereinafter occasionally referred to as drive signals Sg collectively) to control the bidirectional switches Sw1 to Sw9 of the power convertor 10.

For example, the switching elements Swa of the bidirectional switches Sw1 to Sw9 are respectively driven by the drive signal S1a to S9a, and the switching elements Swb of the bidirectional switches Sw1 to Sw9 are respectively driven by the drive signals S1b to S9b.

2. Configuration of Controller 20

Figure 3:
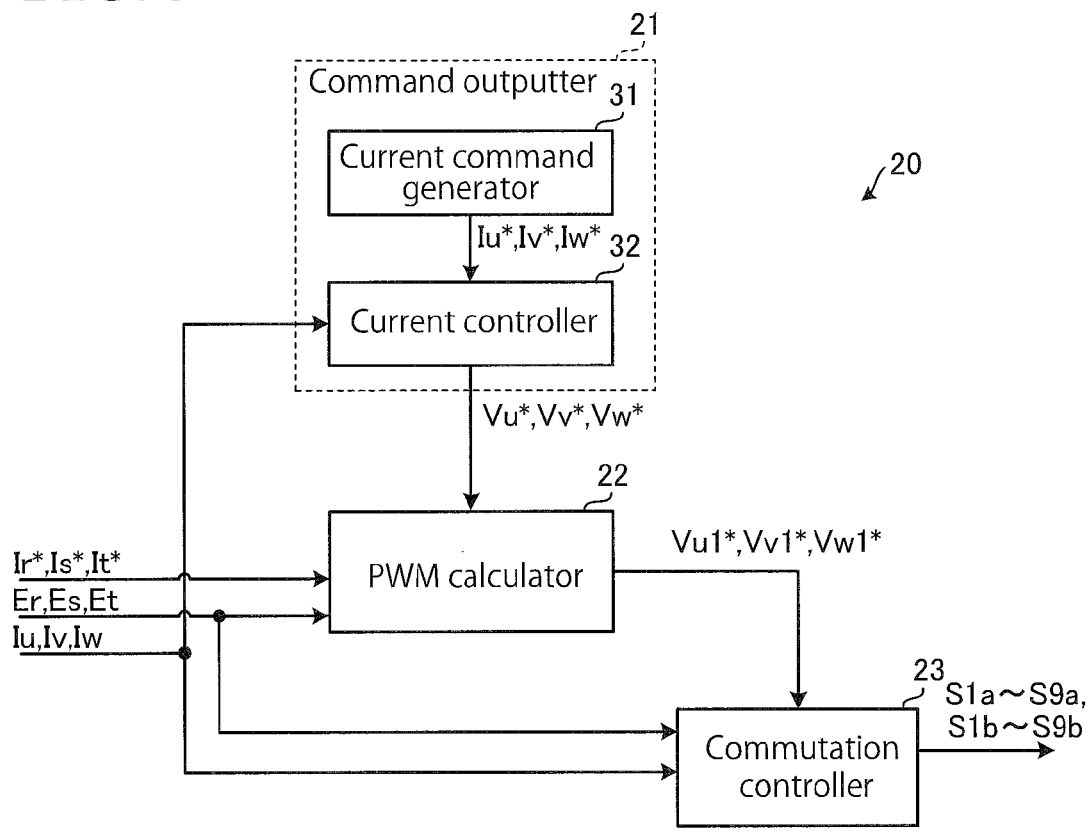
FIG. 3 is a diagram illustrating an exemplary configuration of a controller illustrated in FIG. 1.

FIG. 3 is a diagram illustrating an exemplary configuration of the controller 20. As illustrated in FIG. 3, the controller 20 includes a command outputter 21, a PWM calculator 22, and a commutation controller 23 (which is an example of the drive controller).

The controller 20 includes a microcomputer and various circuits. The microcomputer includes a central processing unit (CPU), a read only memory (ROM), a random access memory (RAM), and input-output ports. The CPU of the microcomputer reads a program stored in the ROM and executes the program so as to function as the command outputter 21, the PWM calculator 22, and the commutation controller 23. It is noted that the controller 20 may be made up of hardware alone, without any programs.

The command outputter 21 generates and outputs output voltage commands Vu*, Vv*, and Vw* (which are examples of the output phase voltage commands) of the respective output phases at predetermined control intervals. The command outputter 21 includes a current command generator 31 and a current controller 32.

The current command generator 31 generates output current commands Iu*, Iv*, and Iw* based on, for example, a frequency command f*. The current command generator 31 may generate the output current commands Iu*, Iv*, and Iw* based on a torque command T*, instead of the frequency command f*.

Based on the output current commands Iu*, Iv*, and Iw*, and based on the output phase currents Iu, Iv, and Iw, the current controller 32 generates and outputs the output voltage commands Vu*, Vv*, and Vw* of the respective output phases at predetermined control intervals. For example, for the U phase, the current controller 32 performs proportional integral (PI) control to make the difference between the output current command Iu* and the output phase current Iu zero, so as to generate the output voltage command Vu*. Similarly, for the V phase and the W phase, the current controller 32 performs the PI control, for example, to generate the output voltage commands Vv* and Vw*.

Based on values including the input phase voltages Er, Es, and Et, the output voltage commands Vu*, Vv*, and Vw*, and input current commands Ir*, Is*, and It*, the PWM calculator 22 calculates an output vector ratio indicating the duty ratio of pulse width modulation (PWM) control in every half-cycle of the carrier wave Sc using the space vector method. The calculation using the space vector method may be based on the conventional, known technique disclosed in WO 2006/118026, for example.

Based on the calculated output vector ratio, the PWM calculator 22 generates PWM control commands Vu1*, Vv1*, and Vw1* (which are examples of the control command and will be hereinafter occasionally referred to as PWM control commands Vo1* collectively). The PWM calculator 22 outputs the PWM control commands Vo1* to the commutation controller 23. A configuration of the PWM calculator 22 will be described in detail later.

Based on the PWM control commands Vo1*, the commutation controller 23 generates drive signals Sg. When the PWM control commands Vo1* are changed, the commutation controller 23 performs commutation control processing using a predetermined commutation method including a plurality of steps to generate the drive signals Sg. Thus, the switching elements constituting the bidirectional switches are individually switched in a predetermined order to eliminate or minimize a line-to-line short-circuiting of the AC power source 2 and output opening of the matrix convertor 1. Examples of the commutation method include, but are not limited to, four-step current commutation and four-step voltage commutation. These commutation methods are disclosed in, for example, Japanese Unexamined Patent Application Publication No. 2004-7929 and Japanese Unexamined Patent Application Publication No. 2007-82286.

3. Configuration of PWM Calculator 22

Figure 4:
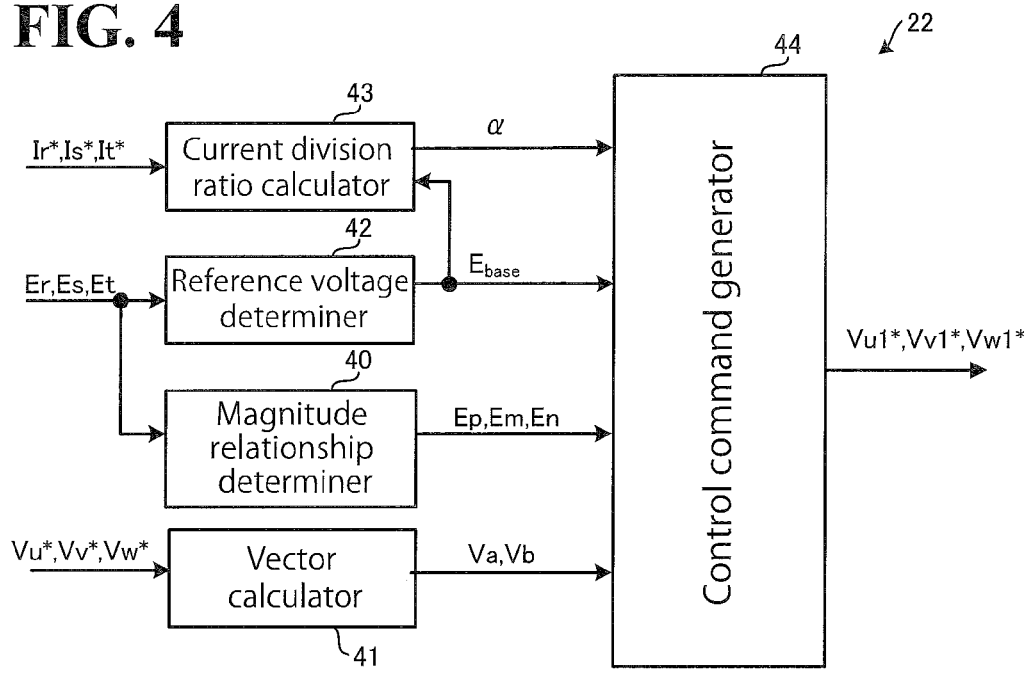
FIG. 4 is a diagram illustrating an exemplary configuration of a PWM calculator illustrated in FIG. 3.

FIG. 4 is a diagram illustrating an exemplary configuration of the PWM calculator 22. As illustrated in FIG. 4, the PWM calculator 22 includes a magnitude relationship determiner 40, a vector calculator 41, a reference voltage determiner 42, a current division ratio calculator 43, and a control command generator 44. The PWM calculator 22 uses the space vector method to generate the PWM control commands Vo1* using the two-phase modulation, for example.

The two-phase modulation is a method of commutation by which one of the output phases, namely, the U phase, the V phase, and the W phase, is fixed at a reference voltage $E_{base}$, and the other two output phases are switched between the input phase voltages Ep, Em, and En. The input phase voltages Er, Es, and Et are regarded as the input phase voltages Ep, Em, and En in descending order of magnitude.

Figure 5:
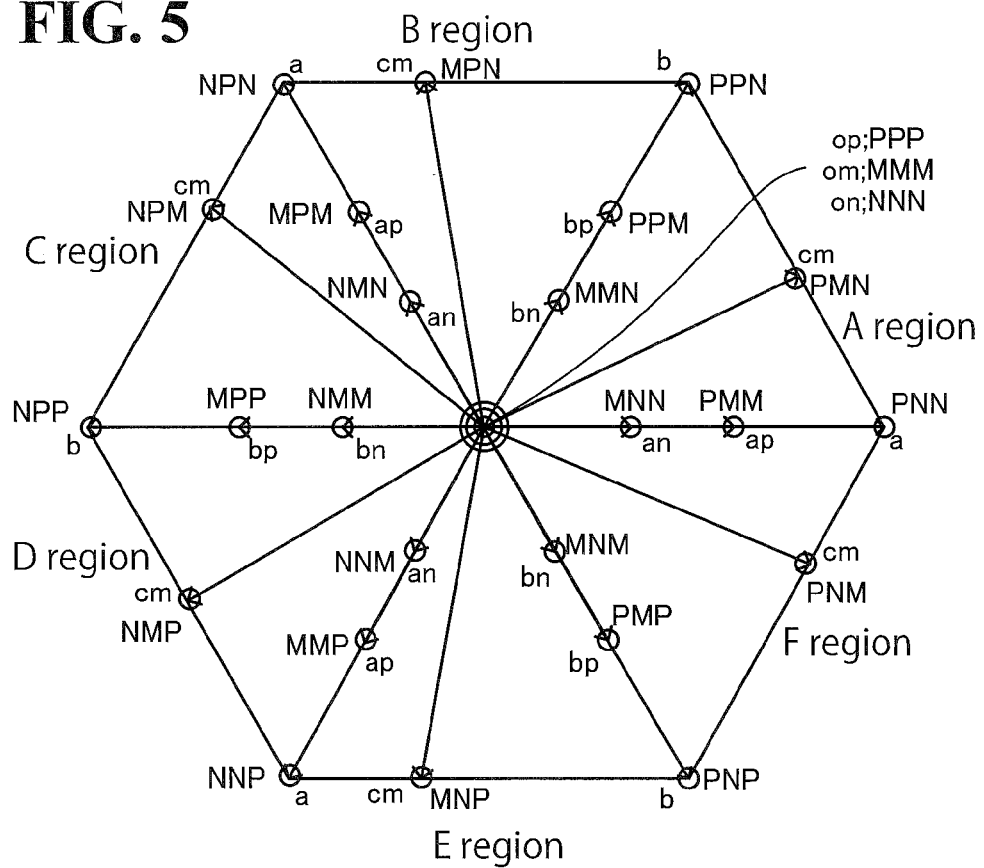
FIG. 5 is a diagram illustrating exemplary space vectors of output voltages.

The space vector method will now be described. For the R phase, the S phase, and the T phase of the AC power source 2, assume that the maximum voltage phase is represented by P, the minimum voltage phase is represented by N, and the intermediate voltage phase is represented by M. In this case, the space vectors of the output voltages can be represented as in FIG. 5. FIG. 5 is a diagram illustrating exemplary space vectors of the output voltages. The maximum voltage phase P is an input phase corresponding to the maximum voltage (input phase voltage Ep) among the input phase voltages Er, Es, and Et. The intermediate voltage phase M is an input phase corresponding to the intermediate voltage (input phase voltage Em) among the input phase voltages Er, Es, and Et. The minimum voltage phase N is an input phase corresponding to the minimum voltage (input phase voltage En) among the input phase voltages Er, Es, and Et.

Referring to FIG. 5, "a-vector" is a vector term indicating a state in which one of the output phases, namely, the U phase, the V phase, and the W phase, is connected to the maximum voltage phase P, and in which the rest of the output phases are connected to the minimum voltage phase N. "b-vector" is a vector term indicating a state in which one of the output phases is connected to the minimum voltage phase N, and in which the rest of the output phases are connected to the maximum voltage phase P. For example, a state in which the U phase is connected to the maximum voltage phase P, and the V phase and the W phase are connected to the minimum voltage phase N is represented by "PNN", which is an "a-vector". Similarly, "NPN" and "NNP" are "a-vectors". "PPN", "PNP", and "NPP" are "b-vectors".

As used herein, "ap-vector", "an-vector", "bp-vector", and "bn-vector" are vector terms indicating states in which at least one of the output phases is connected to the intermediate voltage phase M. For example, "ap-vector" is a vector indicating a state in which one of the output phases is connected to the maximum voltage phase P, and the rest of the plurality of output phases are connected to the intermediate voltage phase M. "an-vector" is a vector indicating a state in which one of the output phases is connected to the intermediate voltage phase M, and the rest of the plurality of output phases are connected to the minimum voltage phase N. "bp-vector" is a vector indicating a state in which two of the output phases are connected to the maximum voltage phase P, and the rest of the plurality of output phases is connected to the intermediate voltage phase M. "bn-vector" is a vector indicating a state in which two of the output phases are connected to the intermediate voltage phase M, and the rest of the plurality of output phases is connected to the minimum voltage phase N.

"cm-vectors" are vector terms indicating states in which the U phase, the V phase, and the W phase are each connected to a different input phase. "on-vector", "om-vector", and "op-vector" indicate states in which the U phase, the V phase, and the W phase are all connected to an identical input phase. "on-vector" is a vector indicating a state in which all the output phases are connected to the minimum voltage phase N. "om-vector" is a vector indicating a state in which all the output phases are connected to the intermediate voltage phase M. "op-vector" is a vector indicating a state in which all the output phases are connected to the maximum voltage phase P. "on-vector", "om-vector", and "op-vector" are zero vectors, and the rest of the vectors are effective vectors.

Figure 6:
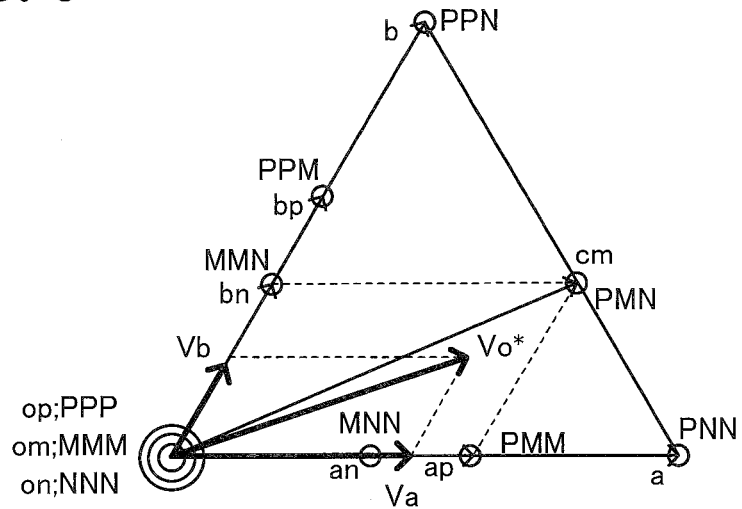
FIG. 6 is a diagram illustrating exemplary correspondence between an output voltage command and space vectors.

FIG. 6 is a diagram illustrating exemplary correspondence between the output voltage command Vo and space vectors. As illustrated in FIG. 6, the PWM calculator 22 uses a switching pattern of a combination of a plurality of output vectors to turn an "a-vector component Va" and "b-vector component Vb" of the output voltage command Vo* into the PWM control commands Vu1*, Vv1*, and Vw1*. Then, the PWM calculator 22 outputs the PWM control commands Vu1*, Vv1*, and Vw1*. The combination is selected from "a-vector", "ap-vector", "an-vector", "b-vector", "bp-vector", "bn-vector", "cm-vector", "op-vector", "om-vector", and "on-vector".

The magnitude relationship determiner 40 makes a determination as to a magnitude relationship between the input phase voltages Ep, Em, and En. The magnitude relationship determiner 40 regards the input phase voltages Er, Es, and Et as the input phase voltages Ep, Em, and En in descending order of magnitude.

Among the output voltage commands Vu*, Vv*, and Vw*, the vector calculator 41 regards the maximum value as Vmax, the intermediate value as Vmid, and the minimum value as Vmin. Then, the vector calculator 41 calculates the a-vector component Va and the b-vector component Vb based on the following Formulae (1) and (2), for example:

$$|Va|=V\text{max}-V\text{mid} \quad (1)$$

$$|Vb|=V\text{mid}-V\text{min} \quad (2)$$

The reference voltage determiner 42 regards the input phase voltage Vi, which has the largest absolute value among the input phase voltages Er, Es, and Et, as a reference voltage $E_{base}$. When the reference voltage $E_{base}$ is Ep, the current division ratio calculator 43 calculates a current division ratio α based on the following Formula (3), for example. When the reference voltage $E_{base}$ is En, the reference voltage determiner 42 calculates the current division ratio α based on the following Formula (4), for example. In the following Formulae (3) and (4), among the input current commands Ir*, Is*, and It*, current command values of the phases corresponding to the input phase voltages Ep, Em, and En are respectively represented by Ip, Im, and In:

$$\alpha = Im/In \quad (3)$$

$$\alpha = Im/Ip \quad (4)$$

In an input power control section (not illustrated) of the controller 20, the input current commands Ir*, Is*, and It* are generated based on, for example, a positive-phase-sequence component voltage, a negative-phase-sequence component voltage, and a set power factor command. The input current commands Ir*, Is*, and It* cancel the influence of imbalance voltage and also control the power factor of the input current at a desired value.

The control command generator 44 selects one switching pattern from among a plurality of switching patterns. The following Table 1 shows exemplary switching patterns. For example, based on whether the reference voltage $E_{base}$ is the input phase voltage Ep or En, and based on whether the phase state of the input phase voltage Vi satisfies $|Vb|-\alpha|Va|\geq 0$, the control command generator 44 selects one switching pattern from among the switching patterns shown in Table 1. The control command generator 44 calculates a ratio of each of the output vectors constituting the selected switching pattern based on the output voltage commands Vu*, Vv*, and Vw*.

TABLE 1

| | Switching Pattern | | |
|---|---|---|---|
| Condition | Carrier Half-Cycle (Valley → Peak) | Carrier Half-Cycle (Peak → Valley) | Pattern Number |
| $E_{base} \geq 0$, $|Vb| - \alpha|Va| \geq 0$ | op→bp→b→cm→a | a→cm→b→bp→op | 1 |
| $E_{base} \geq 0$, $|Vb| - \alpha|Va| < 0$ | op→bp→ap→cm→a | a→cm→ap→bp→op | 2 |
| $E_{base} < 0$, $|Vb| - \alpha|Va| \geq 0$ | b→cm→a→an→on | on→an→a→cm→b | 3 |
| $E_{base} < 0$, $|Vb| - \alpha|Va| < 0$ | a→cm→bn→an→on | on→an→bn→cm→b | 4 |

FIGS. 7 to 10 are graphs of the carrier wave Sc, the PWM control commands Vu1*, Vv1*, and Vw1*, and the input phase voltages Ep, Em, and En in relation to each other in the two-phase modulation. In FIGS. 7 to 10, the PWM control commands are in the relationship: Vu1*>Vv1*>Vw1*. FIGS. 7 to 10 respectively correspond to pattern numbers 1 to 4 of the switching patterns shown in Table 1. It is noted that timings t10 to t20 in FIGS. 7 to 10 are provided for convenience sake to indicate breaks between the output vectors, and that FIGS. 7 to 10 may have varying timings except t10, t15, and t20. The same applies to the other graphs described later.

The PWM control commands Vu1*, Vv1*, and Vw1* are information or signals indicating the input phase voltage, among the input phase voltages Ep, Em, and En, to which the output phases are to be connected at each timing. To facilitate understanding, in the examples illustrated in FIGS. 7 to 10, the relationships between the PWM control commands Vu1*, Vv1*, and Vw1* and the input phase voltages Ep, Em, and En are indicated by waveforms.

Figure 7:
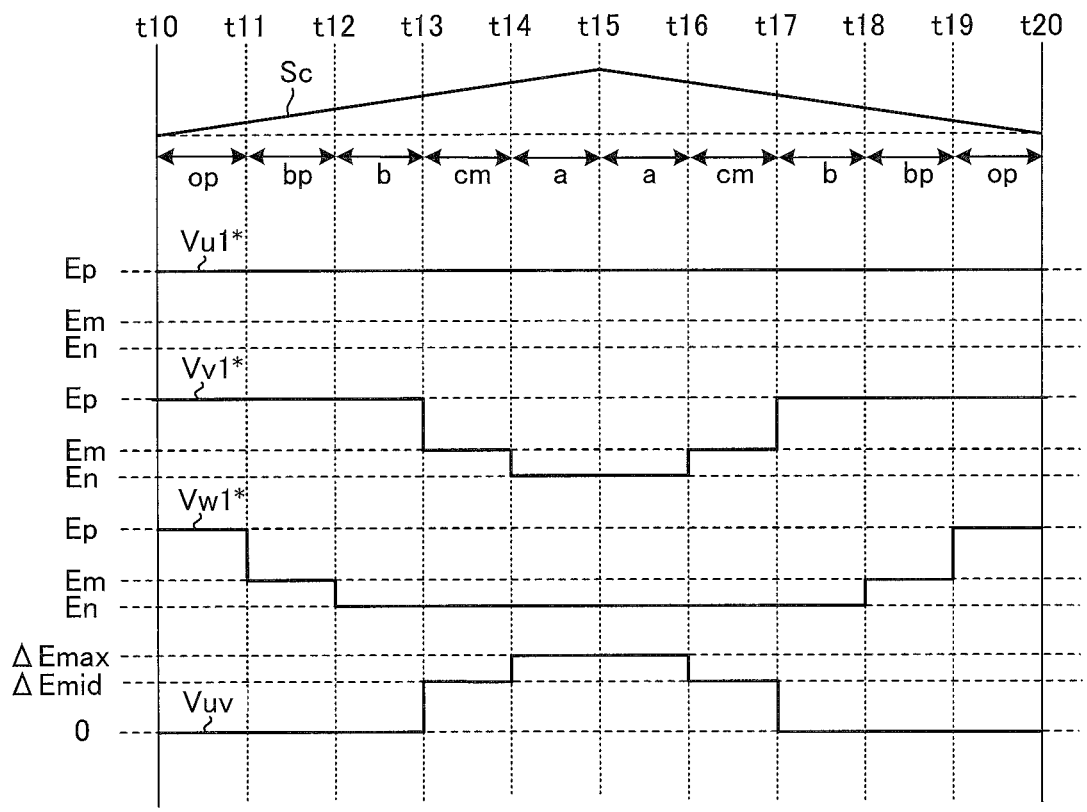
FIG. 7 is a graph of an exemplary switching pattern of pattern number 1.
Figure 8:
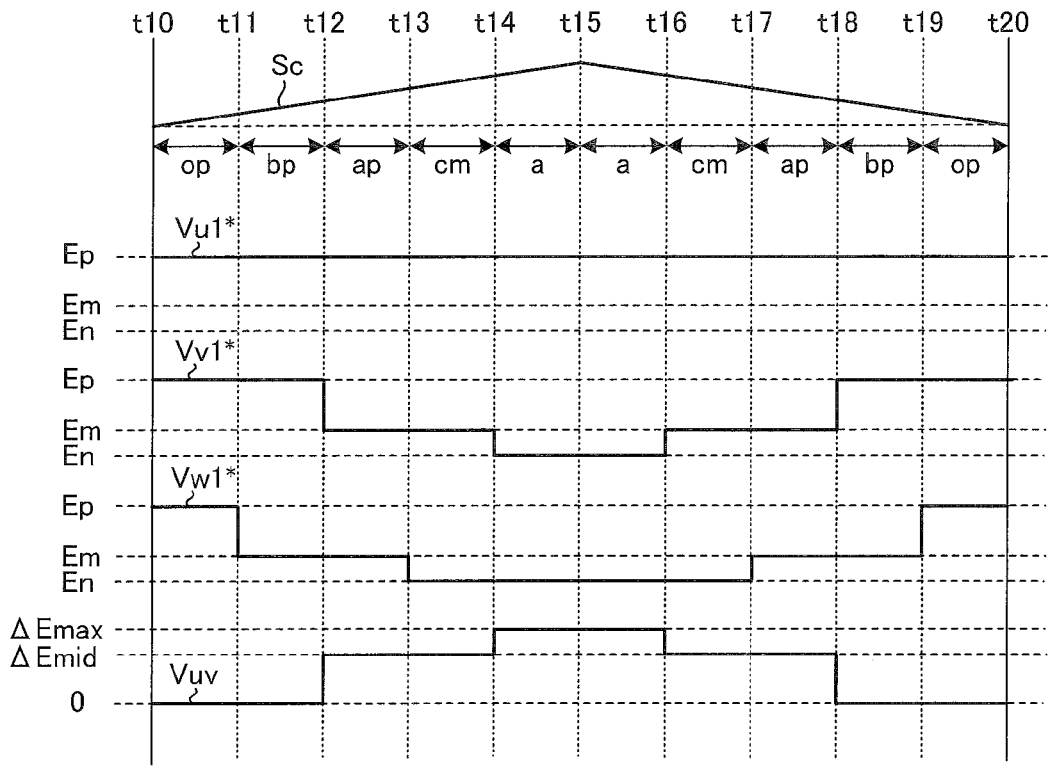
FIG. 8 is a graph of an exemplary switching pattern of pattern number 2.
Figure 9:
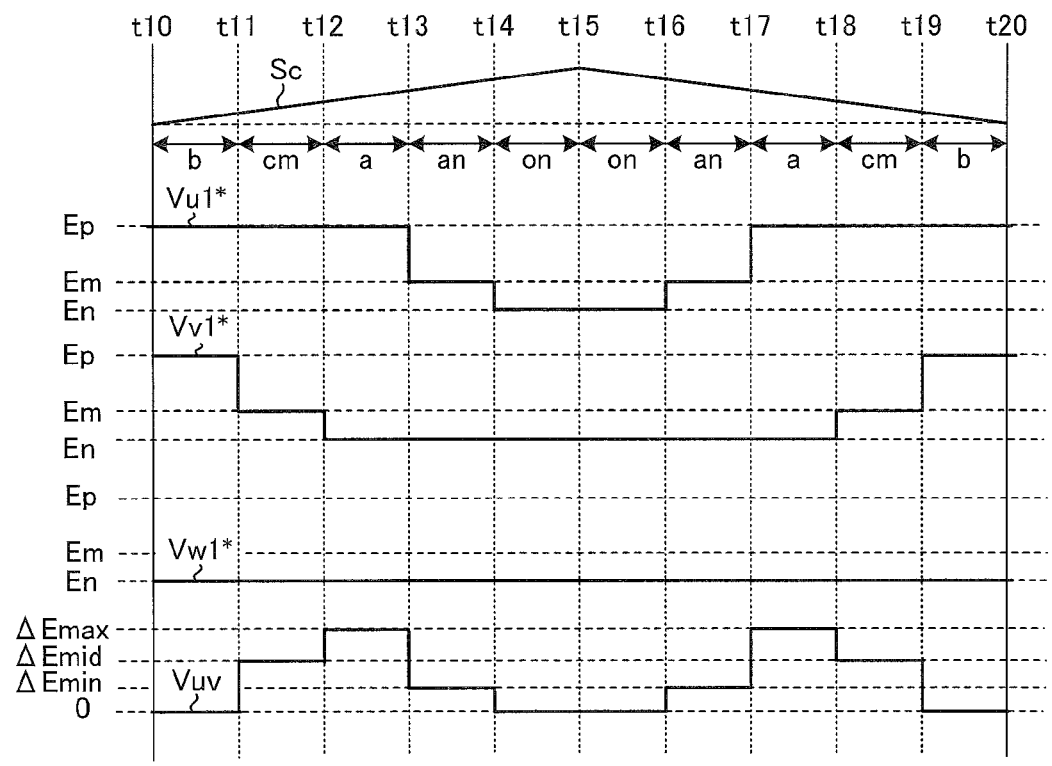
FIG. 9 is a graph of an exemplary switching pattern of pattern number 3.
Figure 10:
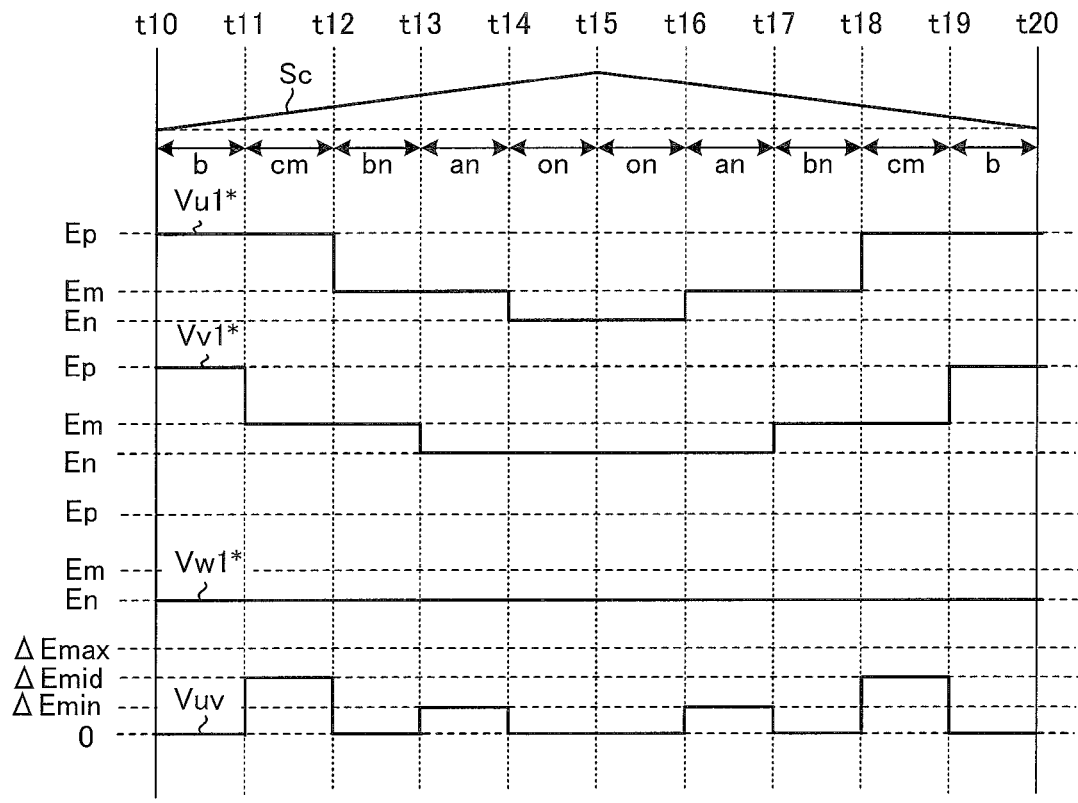
FIG. 10 is a graph of an exemplary switching pattern of pattern number 4.

The control command generator 44 changes, for example, the switching pattern illustrated in FIG. 7 and the switching pattern illustrated in FIG. 9 with each other based on whether the reference voltage $E_{base}$ is the input phase voltage Ep or En. The control command generator 44 also changes the switching pattern illustrated in FIG. 7 and the switching pattern illustrated in FIG. 8 with each other based on, for example, the phase state of the input phase voltage Vi.

4. Configuration of Control Command Generator 44

Figure 11:
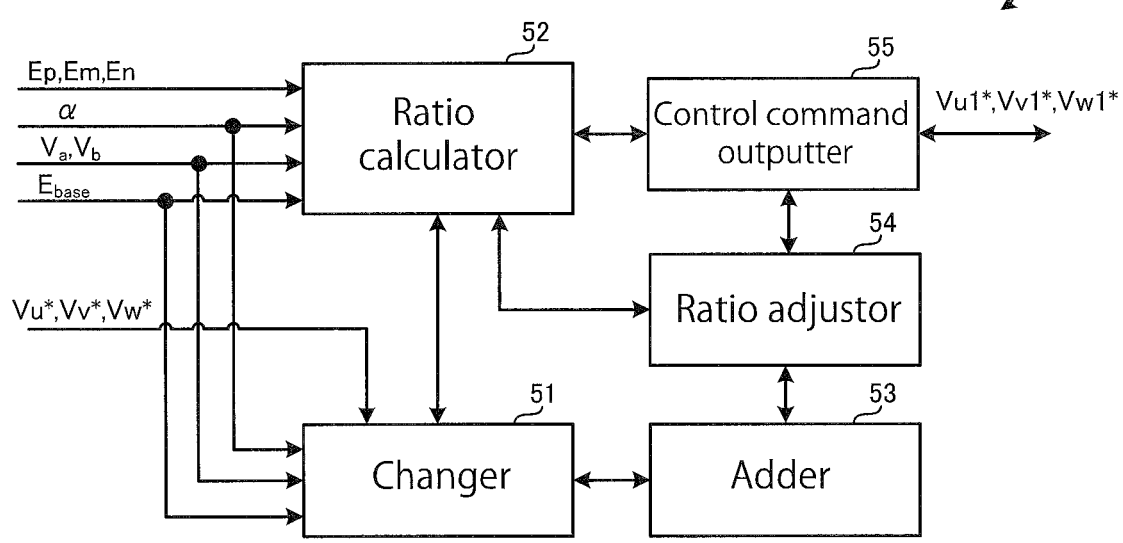
FIG. 11 is a diagram illustrating an exemplary configuration of a control command generator.

As illustrated in FIG. 11, the control command generator 44 includes a changer 51, a ratio calculator 52, an adder 53, a ratio adjustor 54, and a control command outputter 55. FIG. 11 is a diagram illustrating an exemplary configuration of the control command generator 44.

The changer 51 selects one switching pattern from among the switching patterns of pattern numbers 1 to 4 based on whether the reference voltage $E_{base}$ is the input phase voltage Ep or En and whether $|Vb|-\alpha|Va| \geq 0$ is satisfied. The changer 51 notifies the ratio calculator 52 of information of the selected switching pattern. When the reference voltage $E_{base}$ is changed, the changer 51 notifies the adder 53 of information indicating that the reference voltage $E_{base}$ has been changed.

Based on values including the input phase voltages Ep and En, the current division ratio $\alpha$, the vector components Va and Vb, and the reference voltage $E_{base}$, the ratio adjustor 52 calculates ratios of the output vectors (which are examples of the connection ratio of the input phase with respect to the output phase) of the switching pattern of pattern number notified from the changer 51.

When the changer 51 changes the switching pattern based on the reference voltage $E_{base}$, the adder 53 adds the ratio of the output vector including the intermediate voltage phase M to the beginning of the new switching pattern or to the end of the old switching pattern.

The ratio adjustor 54 acquires the ratio of each output vector notified from the ratio calculator 52. When the ratio of the output vector including the intermediate voltage phase M (which is an example of the connection ratio of the intermediate voltage phase M) is lower than a lower limit value $T_{min}$, the ratio adjustor 54 sets the ratio of the output vector at the lower limit value $T_{min}$, and adjusts at least one of the ratios of the remaining output vectors (which are examples of the rest of the connection ratios). This configuration ensures improved accuracy in outputting an output voltage in accordance with the output voltage commands Vu*, Vv*, and Vw*.

When the adder 53 has added the ratio of the output vector including the intermediate voltage phase M to the switching pattern, the ratio adjustor 54 adjusts at least one of the ratios of the output vectors from the ratio calculator 52. This configuration ensures improved accuracy in outputting an output voltage in accordance with the output voltage commands Vu*, Vv*, and Vw*.

Based on the ratios of the output vectors of the switching pattern calculated by the ratio calculator 52 or based on the ratios of the output vectors of the switching pattern after the adjustment by the ratio adjustor 54, the control command outputter 55 generates the PWM control commands Vu1*, Vv1*, and Vw1*.

The control command generator 44 prevents change between the maximum voltage phase P and the minimum voltage phase N in connection to the output phase. Preventing change between the maximum voltage phase P and the minimum voltage phase N eliminates or minimizes surge voltage (such as motor surge voltage, in the case where the AC device 3 is a motor). With no or minimal surge voltage, the accuracy of the output property improves. In order to prevent the change between the maximum voltage phase P and the minimum voltage phase N in connection to the output phase, the control command generator 44 implements the following exemplary functions (a) to (c). The functions will be described in detail below.

(a) Set a lower limit value $T_{min}$ to the ratio of the output vector including the intermediate voltage phase M.

(b) Add the ratio of the output vector including the intermediate voltage phase M to the switching pattern.

(c) Allow the output voltage region to be changed while a zero vector is being output.

4.1. Setting of Lower Limit Value

The control command generator 44 calculates the output vector ratios in such a manner as to prevent the ratio of the output vector to output the intermediate voltage phase M from becoming less than the lower limit value $T_{min}$.

Figure 12:
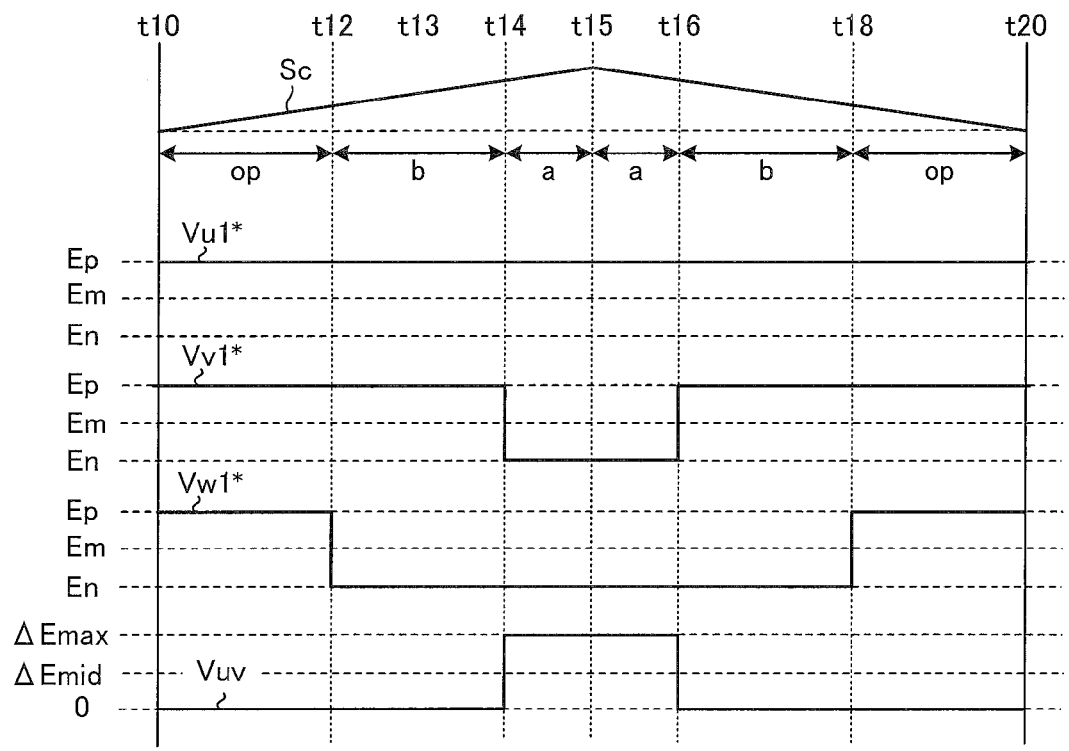
FIG. 12 is a graph of PWM control commands in relation to input phase voltages in a case where the input phase voltages are at zero crossing points and no lower limit value is set to output vector.

At zero crossing points of the input phase voltages Er, Es, and Et, the current division ratio $\alpha$ is zero. When the current division ratio $\alpha$ is zero and when no lower limit value $T_{min}$ is set, the intermediate voltage phase M cannot be used, as illustrated in FIG. 12. FIG. 12 is a graph of the PWM control commands Vo1* and the input phase voltages Ep, and En in relation to each other in a case where the input phase voltages Er, Es, and Et are at zero crossing points and when no lower limit value $T_{min}$ is set to the output vector. In FIG. 12, the PWM control commands are in the relationship: Vu1*>Vv1*>Vw1*.

When the input phase voltages Er, Es, and Et are in the vicinity of the zero crossing points, the current division ratio $\alpha$ is in the vicinity of zero. When the current division ratio $\alpha$ is in the vicinity of zero, the intermediate voltage phase M may not be output due to dead time of the switching element, for example. Thus, when the input phase voltages Er, Es, and Et are at and in the vicinity of the zero crossing points, the intermediate voltage phase M may not be output.

In view of these circumstances, the control command generator 44 restricts the ratio of the output vector to output the intermediate voltage phase M at or above the lower limit value $T_{min}$. The lower limit value $T_{min}$ is set to be a ratio at which the intermediate voltage phase M can be output from the power convertor 10 to the output phase. For example, the lower limit value $T_{min}$ is set based on the period of time from the start timing of the commutation control to the timing at which the voltage of the output phase is changed, or based on turn-off time of the switching element. When the commutation method used in the commutation controller 23 is four-step current commutation, the lower limit value $T_{min}$ may be a sum of a period of commutation time for two steps, turn-off time of the switching elements Swab, and minimum output time of the intermediate phase voltage Emid.

In the case of the switching pattern of pattern number 1, the control command generator 44 restricts the ratio, $T_{bp}$, of "bp-vector" and the ratio, $T_{cm}$, of "cm-vector" at or above the lower limit value $T_{min}$.

In the case of the switching pattern of pattern number 2, the control command generator 44 restricts the ratio, $T_{ap}$, of "ap-vector", for example, at or above the lower limit value $T_{min}$. It is noted that although "bp-vector" and "cm-vector" adjacent to "ap-vector" are also output vectors to output the intermediate voltage phase M, "ap-vector", "bp-vector", and "cm-vector" have a common output phase to which to output the intermediate voltage phase M. Hence, restricting the ratio $T_{ap}$ of "ap-vector" at or above the lower limit value $T_{min}$ ensures that the intermediate voltage phase M is output when the input phase voltages Er, Es, and Et are at and in the vicinity of the zero crossing points, even if the ratios of "bp-vector" and "cm-vector" are zero.

In the case of the switching pattern of pattern number 3, the control command generator 44 restricts the ratio, $T_{cm}$, of "cm-vector" and the ratio, $T_{an}$, of "an-vector" at or above the lower limit value $T_{min}$.

In the case of the switching pattern of pattern number 4, the control command generator 44 restricts the ratio, $T_{bn}$, of "bn-vector", for example, at or above the lower limit value $T_{min}$. It is noted that although "cm-vector" and "an-vector" adjacent to "bn-vector" are also output vectors to output the intermediate voltage phase M, "bn-vector", "cm-vector", and "an-vector" have a common output phase to which to output the intermediate voltage phase M. Hence, the intermediate voltage phase M can be output similarly to the case of the switching pattern of pattern number 2.

Figure 13:
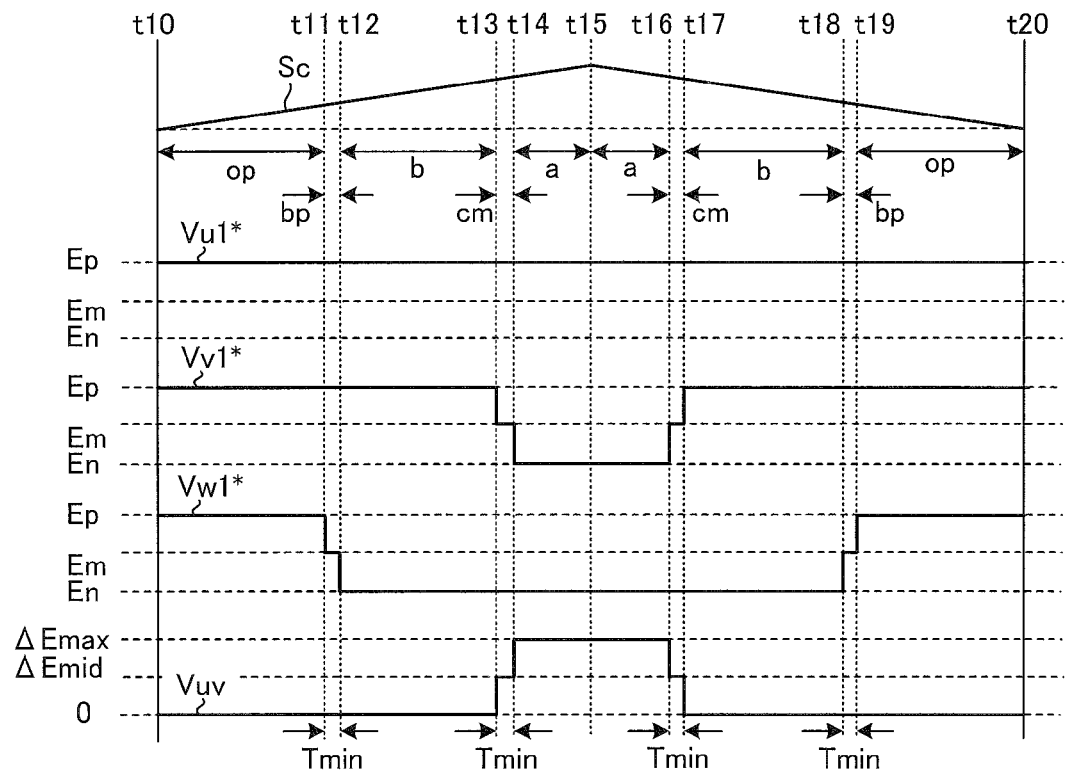
FIG. 13 is a graph of PWM control commands in relation to input phase voltages in a case where the input phase voltages are at zero crossing points and a lower limit value is set to output vector.

FIG. 13 is a graph of the PWM control commands Vo1* and the input phase voltages Ep, Em, and En in relation to each other in a case where one of the input phase voltages Er, Es, and Et is at a zero crossing point and when the lower limit value $T_{min}$ is set in the case of the switching pattern of pattern number 1. In FIG. 13, the PWM control commands are in the relationship: Vu1*>Vv1*>Vw1*.

As illustrated in FIG. 13, setting the lower limit value $T_{min}$ to the ratio of the output vector to output the intermediate voltage phase M ensures that three levels of output voltages including the intermediate voltage phase M are output to two output phases.

As described above, the control command generator 44 uses the ratio calculator 52 and the ratio adjustor 54 for the calculation to restrict the ratio of the output vector to output the intermediate voltage phase M at or above the lower limit value $T_{min}$. This configuration, however, should not be construed in a limiting sense. Any configuration is possible insofar as the ratios of the output vectors of the switching pattern are calculated with the ratio of the output vector to output the intermediate voltage phase M being restricted at or above the lower limit value $T_{min}$.

4.2. Addition of Output Vector to Output Intermediate Voltage Phase M

The control command generator 44 is capable of adding the output vector to use the intermediate voltage phase M to the switching patterns of pattern numbers 1 to 4 at the time when the reference voltage $E_{base}$ is changed. This configuration prevents change between the maximum voltage phase P and the minimum voltage phase N in connection to the output phase at the time when the reference voltage $E_{base}$ is changed, and ensures gradual, three levels of change.

Figure 14:
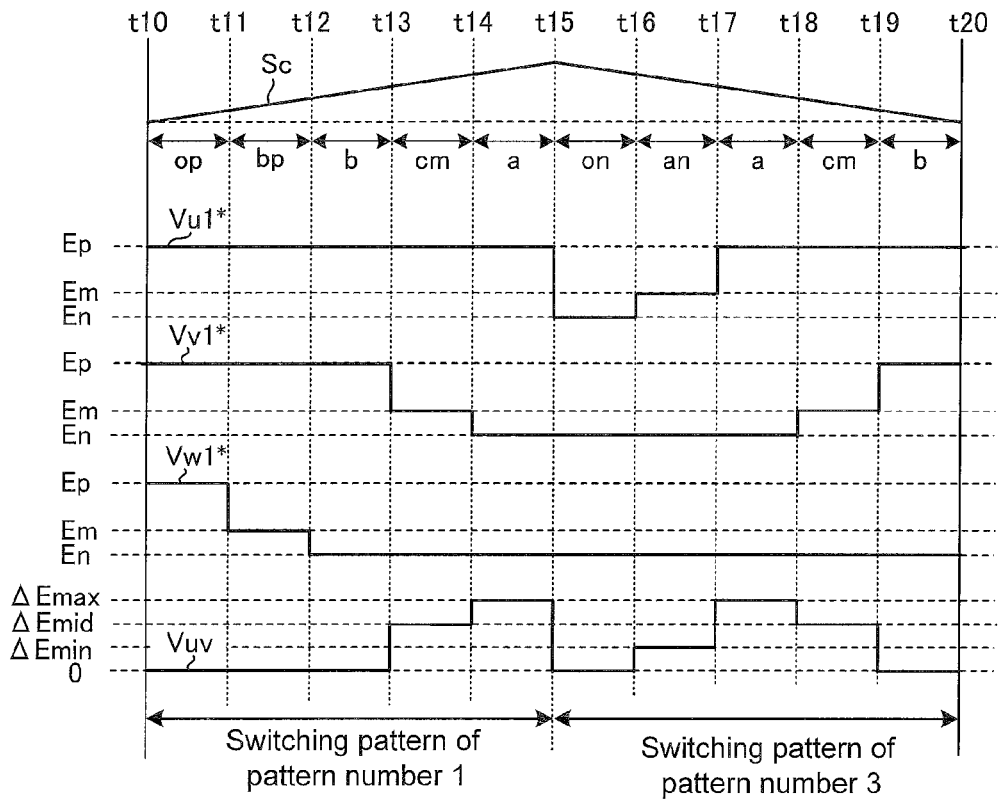
FIG. 14 is a graph of PWM control commands in relation to input phase voltages in a case where a switching-pattern number is changed at a timing corresponding to a peak of a carrier wave.

Assume that the control command generator 44 changes the switching pattern of pattern number 1 to the switching pattern of pattern number 3 at the timing corresponding to a peak of the carrier wave Sc (for example, at timing t15 illustrated in FIG. 7). FIG. 14 illustrates, under this assumption, correspondence relationship between the PWM control commands Vo1* and the input phase voltages Ep, Em, and En.

As illustrated in FIG. 14, at timing t15, which corresponds to the peak of the carrier wave Sc, the PWM control command Vu1* changes from a state indicating connection to the maximum phase voltage Ep to a state indicating connection to the minimum phase voltage En. The change causes the output phase voltage Vu to change from the maximum phase voltage Ep to the minimum phase voltage En. Thus, no intermediate phase voltage Em is output. Such a phenomenon occurs at any time of change of the switching patterns of pattern numbers 1 to 4.

In view of this situation, the control command generator 44 adds the output vector to use the intermediate voltage phase M to the switching patterns of pattern numbers 1 to 4 at the time when the reference voltage $E_{base}$ is changed, as illustrated in Table 2, for example.

TABLE 2

| Change of $E_{base}$ | Change timing | Pattern number on the switching side | Pattern number on the switched side | Switching pattern after addition of output vector |
|---|---|---|---|---|
| Ep → En | Peak | Pattern number 1 → | Pattern number 3 | an → Pattern number 3 |
|  |  | Pattern number 2 → | Pattern number 4 | an → Pattern number 4 |
|  | Valley | Pattern number 1 → | Pattern number 3 | bp → Pattern number 3 |
|  |  | Pattern number 2 → | Pattern number 4 | bp → Pattern number 4 |
| En → Ep | Peak | Pattern number 3 → | Pattern number 1 | an → Pattern number 1 |
|  |  | Pattern number 4 → | Pattern number 2 | an → Pattern number 2 |
|  | Valley | Pattern number 3 → | Pattern number 1 | bp → Pattern number 1 |
|  |  | Pattern number 4 → | Pattern number 2 | bp → Pattern number 2 |

As illustrated in Table 2, the control command generator 44 selects an output vector to add to the switching pattern based on whether the reference voltage $E_{base}$ is changed to the maximum phase voltage Ep or the minimum phase voltage En and based on whether the change timing corresponds to a peak or a valley of the carrier wave Sc. In the embodiment illustrated in FIG. 7, the timing corresponding to a valley of the carrier wave Sc is timings t10 and t20, and the timing corresponding to the peak of the carrier wave Sc is timing t15.

For example, assume that the control command generator 44 changes the reference voltage $E_{base}$ from the maximum phase voltage Ep to the minimum phase voltage En at the timing corresponding to a peak of the carrier wave Sc in the case of using the switching pattern of pattern number 1 to generate the PWM control commands Vo1*. In this case, the control command generator 44 adds "an-vector" to the beginning of the switching pattern of pattern number 3. Thus, the control command generator 44 generates the PWM control commands Vo1* using the switching pattern that causes the output vectors to be output in the order: "an-vector", "on-vector", "an-vector", "a-vector", "cm-vector", and "b-vector".

For another example, assume that the control command generator 44 changes the reference voltage $E_{base}$ from the maximum phase voltage Ep to the minimum phase voltage En at the timing corresponding to a valley of the carrier wave Sc in the case of using the switching pattern of pattern number 1 to generate the PWM control commands Vo1*. In this case, the control command generator 44 adds "bp-vector" to the beginning of the switching pattern of pattern number 3 and generates the PWM control commands Vo1* using the resultant switching pattern.

Figure 15:
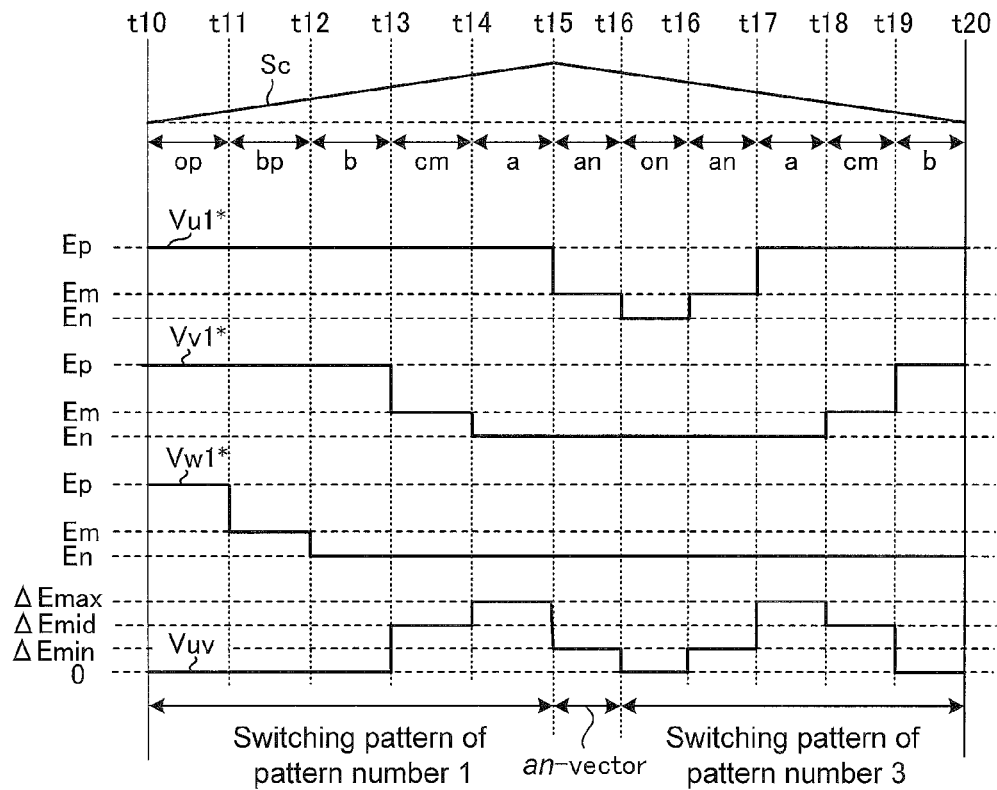
FIG. 15 is a graph of PWM control commands in relation to input phase voltages in a case where a switching-pattern number is changed at a timing corresponding to a peak of a carrier wave.

FIG. 15 is a graph of the PWM control commands Vo1* and the input phase voltages Ep, Em, and En in relation to each other in a case where the switching pattern is changed from pattern number 1 to 3 at the timing corresponding to the peak of the carrier wave Sc. As illustrated in FIG. 15, the intermediate phase voltage Em is output between timings t15 and t16, during which the switching patterns are changed to and from each other. That is, after the PWM control command Vu1* has been changed from a state indicating the maximum phase voltage Ep to a state indicating the intermediate phase voltage Em, the PWM control command Vu1* is changed to a state indicating the minimum phase voltage En.

In this manner, the control command generator 44 adds the output vector to use the intermediate voltage phase M to the switching pattern at the time when the reference voltage $E_{base}$ is changed. This configuration prevents change between the maximum voltage phase P and the minimum voltage phase N in connection to the output phase.

As described above, the control command generator 44 uses the ratio calculator 52, the adder 53, and the ratio adjustor 54 for the addition of the output vector to use the intermediate voltage phase M to the switching pattern at the time when the reference voltage $E_{base}$ is changed. This configuration, however, should not be construed in a limiting sense. Any configuration is possible insofar as, at the time when the switching patterns are changed to and from each other, the ratio of the output vector including the intermediate voltage phase M is added to the beginning or the end of the switching pattern, and the ratios of the other output vectors are adjusted.

4.3. Restriction on Allowing Range Change of Output Voltage

The control command generator 44 is capable of allowing a change in region of the output voltage while a zero vector is being output. This processing is performed by, for example, the changer 51 of the control command generator 44. This configuration prevents change between the maximum voltage phase P and the minimum voltage phase N in connection to the output phase and ensures gradual, three levels of change. As described above, examples of the zero vector include "on-vector", "om-vector", and "op-vector". The zero vector indicates a state in which the U phase, the V phase, and the W phase are all connected to an identical input phase.

As used herein, the region of the output voltage indicates a state in which the magnitude relationship that the output phase voltages Vu, Vv, and Vw have with each other remains unchanged. The changer 51, for example, determines the magnitude relationship that the output phase voltages Vu, Vv, and Vw have with each other based on the output voltage commands Vu*, Vv*, and Vw*. The region of the output voltage is divided into, for example, six regions A to F (see FIG. 5), as listed in the following Table 3. In Table 3, the output voltage commands Vu*, Vv*, and Vw* are indicated as P1, P2, and P3 in descending order of magnitude.

TABLE 3

| Range | P1 | P2 | P3 |
|---|---|---|---|
| A | U | V | W |
| B | V | U | W |
| C | V | W | U |
| D | W | V | U |
| E | W | U | V |
| F | U | W | V |

When Vu*>Vv*>Vw*, for example, the changer 51 determines that the output voltage is in region A, and notifies the ratio calculator 52 of the determination. Based on the region notified from the changer 51, the ratio calculator 52 calculates ratios of output vectors with respect to each output phase (hereinafter occasionally referred to as vector ratios).

For example, assume that the changer 51 determines that the region of the output voltage is region A. In this case, the ratio calculator 52 generates the PWM control commands Vo1*, as in FIG. 7, using the switching pattern of pattern number 1, for example. Alternatively, using the switching pattern of pattern number 2, for example, the ratio calculator 52 generates the PWM control commands Vo1* as if Vu* were replaced by Vv* in FIG. 7.

Figure 16:
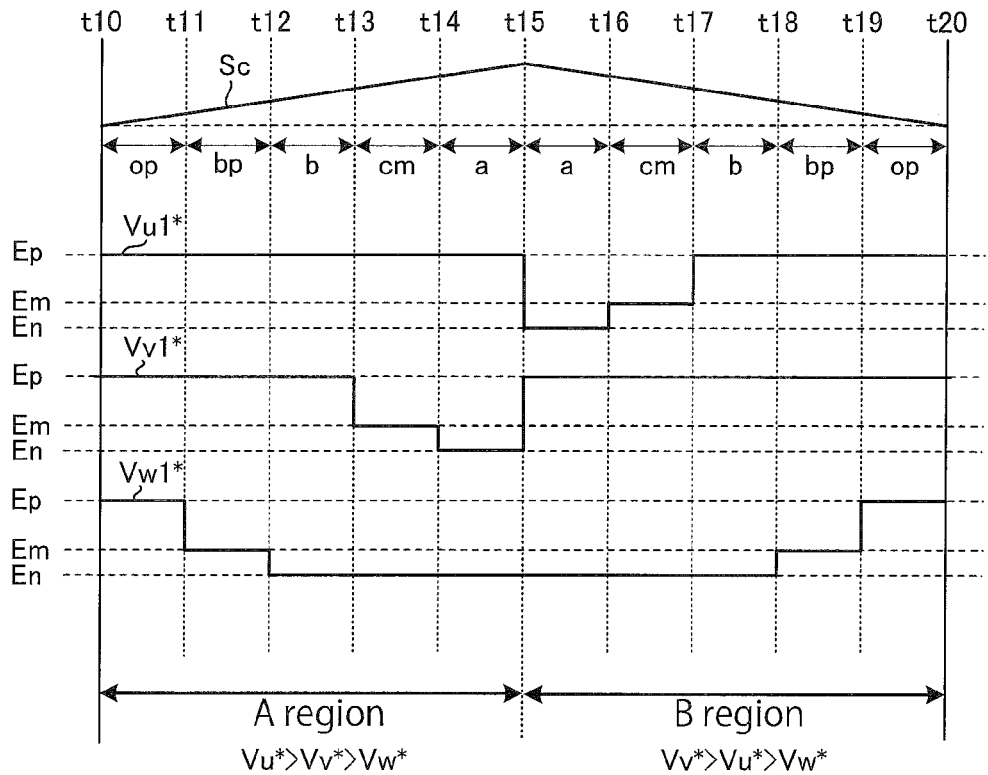
FIG. 16 is a graph of PWM control commands in relation to input phase voltages in a case where a switching pattern is changed at the time when a magnitude relationship that output voltage commands have with each other is changed immediately before a timing corresponding to a peak of a carrier wave.

For example, assume that the reference voltage $E_{base}$ is Ep, and that the magnitude relationship that the output voltage commands Vu*, Vv*, and Vw* have with each other is changed from Vu*>Vv*>Vw* to Vv*>Vu*>Vw* immediately before the timing corresponding to the peak of the carrier wave Sc. FIG. 16 is a graph of the PWM control commands Vu1*, Vv1*, and Vw1* and the input phase voltages Ep, Em, and En in relation to each other in a case where the switching pattern is changed at the time when the state Vu*>Vv*>Vw* is changed to the state Vv*>Vu*>Vw* immediately before the timing corresponding to the peak of the carrier wave Sc.

In this case, assume that region A is changed to region B in the space vector. Then, as illustrated in FIG. 16, at timing t15, which corresponds to the peak of the carrier wave Sc, the PWM control command Vu1* is changed from a state indicating connection to the maximum phase voltage Ep to a state indicating connection to the minimum phase voltage En, and the PWM control command Vv1* is changed from a state indicating connection to the minimum phase voltage En to a state indicating connection to the maximum phase voltage Ep. The changes cause the output phase voltages Vu and Vv to be changed between the maximum phase voltage Ep and the minimum phase voltage En. Thus, no intermediate phase voltage Em is output.

In view of this situation, the changer 51 allows a change in region of the output voltage while a zero vector is being output. This configuration prevents change between the maximum voltage phase P and the minimum voltage phase N in connection to the output phase, and ensures gradual, three levels of change.

For example, in the case of the switching patterns of pattern numbers 1 and 2, the changer 51 notifies the ratio calculator 52 of a region change at a timing corresponding to a valley of the carrier wave Sc, and does not notify the ratio calculator 52 of the region change at the timing corresponding to the peak of the carrier wave Sc. In the case of the switching patterns of pattern numbers 3 and 4, the changer 51 notifies the ratio calculator 52 of a region change at the timing corresponding to the peak of the carrier wave Sc, and does not notify the ratio calculator 52 of the region change at a timing corresponding to a valley of the carrier wave Sc.

Figure 17:
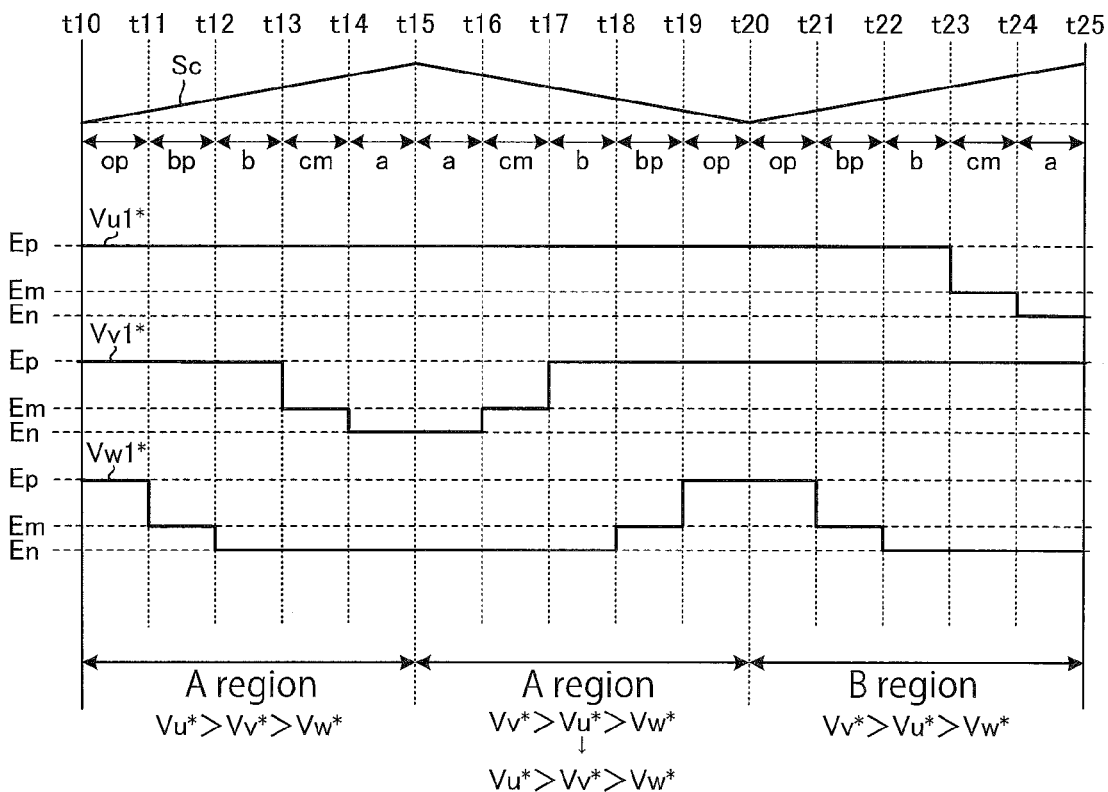
FIG. 17 is a graph of PWM control commands in relation to input phase voltages in a case where a change in region of an output voltage is allowed while a zero vector is being output at the time when a magnitude relationship that output voltage commands have with each other is changed.

FIG. 17 is a graph of the PWM control commands Vu1*, Vv1*, and Vw1* in relation to the input phase voltages Ep, Em, and En in a case where a change in region of the output voltage is allowed while a zero vector is being output at the time when the magnitude relationship that the output voltage commands Vu*, Vv*, and Vw* have with each other is changed. FIG. 17 illustrates an example in which the reference voltage $E_{base}$ is Ep, and the state Vu*>Vv*>Vw* is changed to the state Vv*>Vu*>Vw* immediately before timing t15, which corresponds to the peak of the carrier wave Sc. The output vector at timing t15, which corresponds to the peak of the carrier wave Sc, is "a-vector" and not a zero vector. Hence, as illustrated in FIG. 17, the changer 51 does not change region A to region B in the space vector.

In this manner, at timing t15, the control command generator 44 regards the magnitude relationship that the output voltage commands Vu*, Vv*, and Vw* have with each other not as Vv*>Vu*>Vw* but as Vu*>Vv*>Vw*, and generates and outputs the PWM control commands Vu1*, Vv1*, and Vw1*. This configuration prevents change between the maximum voltage phase P and the minimum voltage phase N in connection to the output phase.

In the above description, the changer 51 allows a change in region of the output voltage while a zero vector is being output. The changer 51, however, will not be limited to the configuration illustrated in FIG. 11. Another possible embodiment is that the changer 51 is incorporated in the ratio calculator 52.

4.4. Calculation of Vector Ratio

In the above-described setting of the lower limit value $T_{min}$ and addition of the output vector, the control command generator 44 is capable of adjusting the ratio of each output vector so as to improve accuracy of the output voltage. Adjustment of the ratios of output vectors in the switching pattern will be described below.

In the case of the switching pattern of pattern number 1, the ratio calculator 52 calculates vector ratios $T_{op}$, $T_{bp}$, $T_b$, $T_{cm}$, and $T_a$ in a half-cycle from a valley to the peak of the carrier wave Sc using, for example, the following Formulae (5) to (9). The vector ratios $T_{op}$, $T_{bp}$, $T_b$, $T_{cm}$, and $T_a$ are respectively ratios of "op-vector", "bp-vector", "b-vector", "cm-vector", and "a-vector".

$$T_a = |Va|/(dE_{max} + dE_{mid} \times \alpha) \tag{5}$$

$$T_{bp} = \alpha(|Va| + |Yb|)/(dE_{max} + dE_{mid} \times \alpha) \tag{6}$$

$$T_b = (|Va| - \alpha|Vb|)/(dE_{max} + dE_{mid} \times \alpha) \tag{7}$$

$$T_{cm} = \alpha|Va|/(dE_{max} + dE_{mid} \times \alpha) \tag{8}$$

$$T_{op} = 1 - (T_{bp} + T_b + T_{cm} T_a) \tag{9}$$

$dE_{max}$, $dE_{mid}$, and $dE_{min}$ are calculated using the following Formulae (10) to (14). It is noted that when the reference voltage $E_{base}$ is Ep, $dE_{mid}$ and $dE_{min}$ are calculated using Formulae (11) and (13), for example. When the reference voltage $E_{base}$ is En, $dE_{mid}$ and $dE_{min}$ are calculated using Formulae (12) and (14), for example.

$$dE_{max} = Ep - En \tag{10}$$

$$dE_{mid} = Ep - Em \tag{11}$$

$$dE_{mid} = Em - En \tag{12}$$

$$dE_{min} = Em - En \tag{13}$$

$$dE_{min} = Ep - Em \tag{14}$$

After the ratio calculator 52 has calculated the vector ratios $T_{op}$, $T_{bp}$, $T_b$, $T_{cm}$, and $T_a$, the ratio adjustor 54 performs adjustment processing with respect to the vector ratios. For example, when the vector ratios $T_{bp}$ and $T_{cm}$ notified from the ratio calculator 52 are lower than the lower limit value $T_{min}$, the ratio adjustor 54 resets the vector ratios $T_{bp}$ and $T_{cm}$ to the lower limit value $T_{min}$. The vector ratios $T_{bp}$ and $T_{cm}$ reset to the lower limit value $T_{min}$ will be referred to as the vector ratios $T_{bp}'$ and $T_{cm}'$ below.

When the vector ratios $T_{bp}$ and $T_{cm}$ are reset to the lower limit value $T_{min}$, "bp-vector" and "cm-vector" increase. The increase may make the output voltage Vo larger than the voltage specified by the output voltage command Vo*.

In view of this situation, the ratio adjustor 54 adjusts the vector ratios $T_a$, $T_b$, and $T_{op}$ using the following Formulae (15) to (17), for example. In Formulae (15) to (17), the vector ratios $T_a$, $T_b$, and $T_{op}$ after the adjustment are respectively indicated as the vector ratios $T_a'$, $T_b'$, and $T_{op}'$. The increase that the vector ratio $T_{cm}'$ has relative to the vector ratio $T_{cm}$ is indicated as $\Delta T_{cm}$, and the increase that the vector ratio $T_{bp}'$ has relative to the vector ratio $T_{bp}$ is indicated as $\Delta T_{bp}$.

$$T_a' = T_a - dE_{mid} \times \Delta T_{cm}/dE_{max} \tag{15}$$

$$T_b' = T_b - (dE_{mid} \times \Delta T_{bp} + dE_{min} \times \Delta T_{cm})/dE_{max} \tag{16}$$

$$T_{op}' = 1 - (T_{bp}'T_b' + T_{cm}' + T_a') \tag{17}$$

Adjusting the vector ratios $T_a$, $T_b$, and $T_{op}$ in this manner eliminates or minimizes the influence of resetting the vector ratios $T_{bp}$ and $T_{cm}$ to the lower limit value $T_{min}$. This configuration ensures improved accuracy in outputting the output voltage. Based on the vector ratios $T_a'$, $T_{bp}'$, $T_b'$, $T_{cm}'$, and $T_{op}'$, the control command outputter 55 generates the PWM control commands Vo1*. For example, the control command outputter 55 generates and outputs the PWM control commands Vu1*, Vv1*, and Vw1* having correspondence relationship with the input phase voltages Ep, Em, and En illustrated in FIG. 7.

In the case of the switching pattern of pattern number 2, the ratio calculator 52 calculates vector ratios $T_{op}$, $T_{bp}$, $T_{ap}$, $T_{cm}$, and $T_a$ using, for example, the following Formulae (18) to (22):

$$T_a = |Va|/(dE_{max} + dE_{mid} \times \alpha) \tag{18}$$

$$T_{bp} = (1+\alpha)|Vb|/(dE_{max} + dE_{mid} \times \alpha) \tag{19}$$

$$T_{ap} = (\alpha|Va| - |Vb|)/(dE_{max} + dE_{mid} \times \alpha) \tag{20}$$

$$T_{cm} = |Vb|/(dE_{max} + dE_{mid} \times \alpha) \tag{21}$$

$$T_{op} = 1 - (T_{bp} + T_{ap} + T_{cm} + T_a) \tag{22}$$

After the ratio calculator 52 has calculated the vector ratios $T_{op}$, $T_{bp}$, $T_{ap}$, $T_{cm}$, and $T_a$, when the vector ratio $T_{ap}$ notified from the ratio calculator 52 is lower than the lower limit value $T_{min}$, the ratio adjustor 54 resets the vector ratio $T_{ap}$ to the lower limit value $T_{min}$. The vector ratio $T_{ap}$ reset to the lower limit value $T_{min}$ will be referred to as the vector ratio $T_{ap}'$ below.

When the vector ratio $T_{ap}$ is reset to the lower limit value $T_{min}$, "ap-vector" increases. The increase may make the output voltage Vo larger than the voltage specified by the output voltage command Vo*.

In view of this situation, the ratio adjustor 54 adjusts the vector ratios $T_a$ and $T_{op}$ using the following Formulae (23) and (24), for example. In Formulae (23) and (24), the vector ratios $T_a$ and $T_{op}$ after the adjustment are respectively indicated as the vector ratios $T_a'$ and $T_{op}'$. The increase that the vector ratio $T_{ap}'$ has relative to the vector ratio $T_{ap}$ is indicated as $\Delta T_{ap}$.

$$T_a' = T_a - dE_{mid} \times \Delta T_{ap}/dE_{max} \tag{23}$$

$$T_{op}' = 1 - (T_{bp} + T_{ap}' + T_{cm} + T_a') \tag{24}$$

Adjusting the vector ratios $T_a$ and $T_{op}$ in this manner eliminates or minimizes the influence of resetting the vector ratio $T_{ap}$ to the lower limit value $T_{min}$. It is noted that based on the vector ratios $T_{op}'$, $T_{bp}$, $T_{ap}'$, $T_{cm}$, and $T_a'$, the control command outputter 55 generates the PWM control commands Vo1*. The adjustment of the output vector ratios in the case of pattern numbers 3 and 4 is similar to the case of pattern numbers 1 and 2, in that ratio adjustment is performed among the output vectors.

The ratio adjustor 54 is also capable of adjusting the ratios of the output vectors at the time of the above-described output vector addition. This configuration improves accuracy of the output voltage.

For example, when "an-vector" is added to the switching pattern of pattern number 1, the ratio adjustor 54 adjusts at least one of the vector ratios $T_b$, $T_{cm}$, $T_a$, $T_{an}$, and $T_{on}$ calculated by the ratio calculator 52. Specifically, the ratio adjustor 54 sets the ratio $T_{an}$ of the added "an-vector" to the lower limit value $T_{min}$, for example. In this case, the ratio adjustor 54 adjusts the vector ratios $T_a$ and $T_{op}$ using the following Formulae (25) and (26), for example. In Formulae (25) and (26), the vector ratios $T_a$ and $T_{op}$ after the adjustment are respectively indicated as the vector ratios $T_a'$ and $T_{op}'$.

$$T_a' = T_a - dE_{mid} \times T_{an}/dE_{max} \quad (25)$$

$$T_{op}' = 1 - (T_{an} + T_{bp} + T_b + T_{cm} + T_a') \quad (26)$$

Adjusting the vector ratios $T_a$ and $T_{op}$ in this manner eliminates or minimizes the influence of adding the vector ratio $T_{an}$. This configuration ensures improved accuracy in outputting the output voltage. Based on the vector ratios $T_{an}$, $T_a'$, $T_{bp}$, $T_b$, $T_{cm}$, and $T_{op}'$, the control command outputter 55 generates the PWM control commands Vo1*. It is noted that in the case of adding "bp-vector" to the switching pattern of pattern number 1 as well, the control command generator 44 similarly adjusts the vector ratios. This configuration ensures improved accuracy in outputting the output voltage.

In the case of adding "an-vector" to the switching patterns of pattern numbers 2 to 4 and in the case of adding "bn-vector" to the switching patterns of pattern numbers 1 to 4, the control command generator 44 performs the ratio adjustment among the output vectors, similarly to the ratio adjustment of the output vectors concerning pattern number 1.

5. Processing Flow

Figure 18:
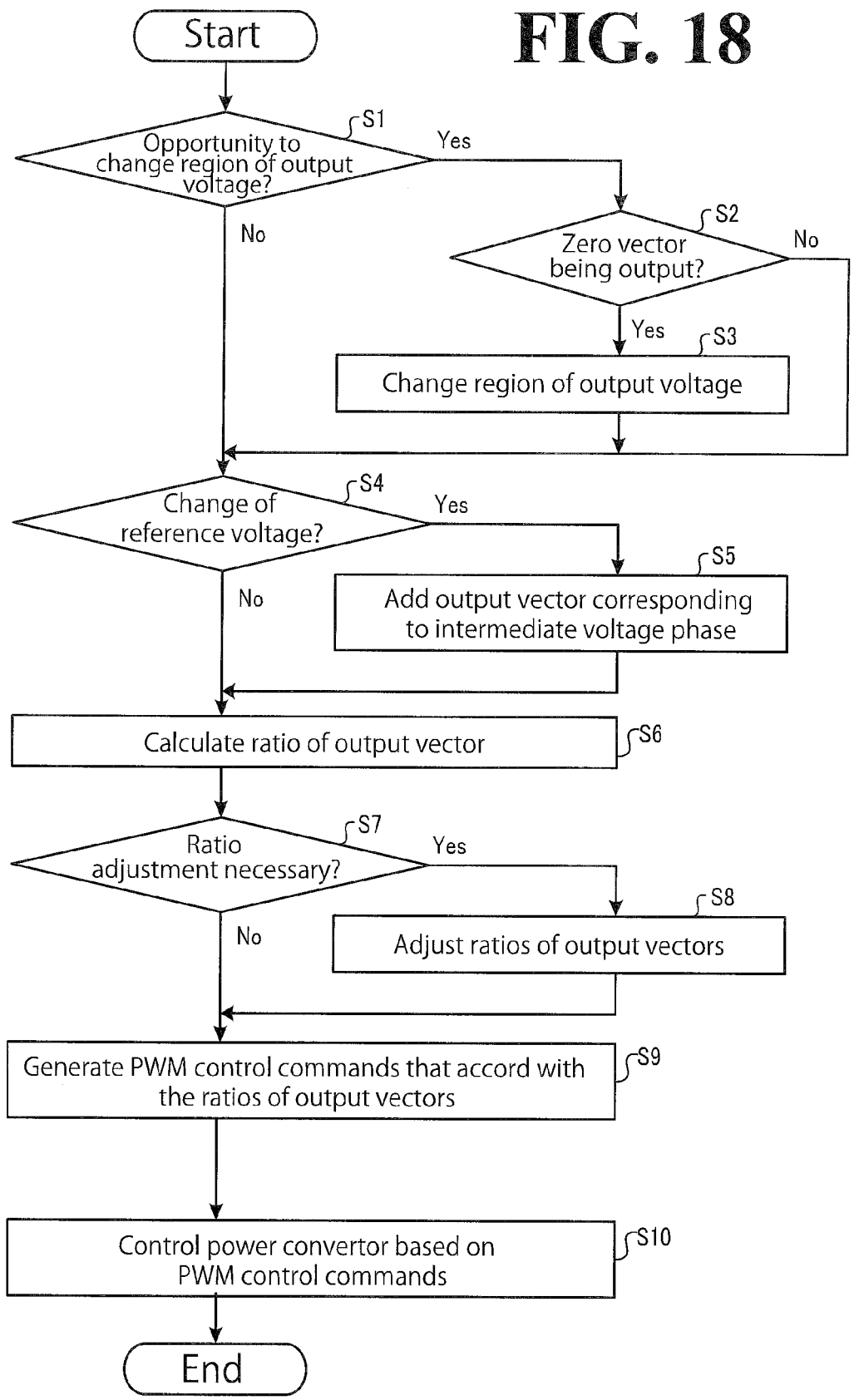
FIG. 18 is a flowchart of exemplary pulse width calculation processing performed by the PWM calculator.

Exemplary processing performed by the PWM calculator 22 will now be described in detail with reference to FIG. 18. FIG. 18 is a flowchart of exemplary pulse width calculation processing performed by the PWM calculator 22.

As illustrated in FIG. 18, the PWM calculator 22 makes a determination as to whether an opportunity has come to change the region (see Table 3) of the output voltage (step S1). When the PWM calculator 22 determines that the opportunity to change the region has come (Yes at step S1), the PWM calculator 22 makes a determination as to whether a zero vector is being output (step S2).

When the PWM calculator 22 determines that a zero vector is being output (Yes at step S2), the region of the output voltage is changed (step S3), and the processing proceeds to step S4. In contrast, when the PWM calculator 22 determines that no zero vector is being output (No at step S2), the processing proceeds to step S4 without changing the region of the output voltage.

At step S4, the PWM calculator 22 makes a determination as to whether the reference voltage $E_{base}$ has been changed. When the PWM calculator determines that the reference voltage $E_{base}$ has been changed (Yes at step S4), the PWM calculator adds the output vector corresponding to the intermediate voltage phase M to the switching pattern (step S5). When the PWM calculator 22 determines that the reference voltage $E_{base}$ has not been changed (No at step S4) or when processing at step S5 ends, the PWM calculator 22 calculates the ratios of the output vectors (step S6).

The PWM calculator 22 also makes a determination as to whether output vector ratio adjustment is necessary (step S7). For example, the PWM calculator 22 determines that output vector ratio adjustment is necessary when the output vector corresponding to the intermediate voltage phase M has been added to the switching pattern or when the ratio of the output vector corresponding to the intermediate voltage phase M is lower than the lower limit value $T_{min}$. When the PWM calculator 22 determines that output vector ratio adjustment is necessary (Yes at step S7), the PWM calculator 22 adjusts the ratio of at least one of the output vectors in the switching pattern (step S8).

When the PWM calculator 22 determines that no output vector ratio adjustment is necessary (No at step S7) or when processing at step S8 ends, the PWM calculator 22 generates the PWM control commands Vo1* that accord with the ratios of the output vectors (step S9). Based on the PWM control commands Vo1*, the commutation controller 23 generates drive signals Sg and controls the power convertor 10 (step S10). It is noted that when the PWM control commands Vo1* are changed, the commutation controller 23 performs commutation control processing by a predetermined commutation method including a plurality of steps so as to generate the drive signals Sg.

As has been described heretofore, the matrix convertor 1 according to the embodiment sets a lower limit to the period of time during which the input phase including the intermediate voltage is connected. This configuration eliminates or minimizes change between the maximum voltage phase P and the minimum voltage phase N in connection to the output phase, and ensures gradual, three levels of change.

In the above description, the PWM calculator 22 calculates the ratios of the output vectors by the space vector method. Another possible embodiment is to calculate the ratios of the output vectors by a carrier comparison method.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A matrix convertor comprising:
   a power convertor comprising a plurality of bidirectional switches disposed between a plurality of input phases and a plurality of output phases; and
   a controller configured to generate a control command based on connection ratios of the plurality of input phases and control the power convertor based on the control command, the control command comprising a switching pattern that causes a first input phase among the plurality of input phases to be connected to one output phase among the plurality of output phases and that causes connection of the plurality of input phases to be switched between a rest of the plurality of output phases, the controller being configured to, in generating the control command, set a lower limit to a period of time during which a second input phase among the plurality of input phases that corresponds to an intermediate voltage is connected to the rest of the plurality of output phases,
   wherein the controller includes a changer configured to change the switching pattern and an adder configured to, when the changer changes the switching pattern, add the connection ratio of the second input phase to at least one of a beginning and an end of the switching pattern.

2. The matrix convertor according to claim 1, wherein the controller comprises a command outputter configured to output an output voltage command, and a PWM calculator configured to, based on the output voltage command, calculate the connection ratios of the plurality of input phases with respect to the rest of the plurality of output phases, and configured to generate the control command based on the connection ratios, wherein the PWM calculator is configured to set the connection ratio of the second input phase at a value equal to or larger than a lower limit value.

3. The matrix convertor according to claim 2, wherein the PWM calculator comprises a ratio calculator configured to, based on the output voltage command, calculate the connection ratios of the plurality of input phases with respect to the rest of the plurality of output phases, and a ratio adjustor configured to, when the connection ratio of the second input phase is smaller than the lower limit value, set the connection ratio of the second input phase at the lower limit value, and configured to adjust at least one connection ratio among a rest of the connection ratios.

4. The matrix convertor according to claim 3, wherein the PWM calculator includes the changer and the adder, and the changer is configured to change the switching pattern based on whether a voltage of an input phase among the plurality of input phases that has a largest absolute value of voltage is a maximum voltage or a minimum voltage.

5. The matrix convertor according to claim 4, wherein the output voltage command comprises a plurality of output phase voltage commands, wherein the switching pattern is specified by a zero vector and an effective vector, and wherein the PWM calculator comprises a changer configured to, when the plurality of output phase voltage commands have a changeable magnitude relationship with each other, change the switching pattern at a timing when the zero vector is being output.

6. The matrix convertor according to claim 4, wherein the PWM calculator comprises a ratio adjustor configured to, when the adder has added the connection ratio of the second input phase to the switching pattern, adjust at least a part of the connection ratio of the switching pattern.

7. The matrix convertor according to claim 6, wherein the output voltage command comprises a plurality of output phase voltage commands, wherein the switching pattern is specified by a zero vector and an effective vector, and wherein the PWM calculator comprises a changer configured to, when the plurality of output phase voltage commands have a changeable magnitude relationship with each other, change the switching pattern at a timing when the zero vector is being output.

8. The matrix convertor according to claim 2, wherein the PWM calculator includes the changer and the adder, and the changer is configured to change the switching pattern based on whether a voltage of an input phase among the plurality of input phases that has a largest absolute value of voltage is a maximum voltage or a minimum voltage.

9. The matrix convertor according to claim 8, wherein the output voltage command comprises a plurality of output phase voltage commands, wherein the switching pattern is specified by a zero vector and an effective vector, and wherein the PWM calculator comprises a changer configured to, when the plurality of output phase voltage commands have a changeable magnitude relationship with each other, change the switching pattern at a timing when the zero vector is being output.

10. The matrix convertor according to claim 8, wherein the PWM calculator comprises a ratio adjustor configured to, when the adder has added the connection ratio of the second input phase to the switching pattern, adjust at least a part of the connection ratio of the switching pattern.

11. The matrix convertor according to claim 10, wherein the output voltage command comprises a plurality of output phase voltage commands, wherein the switching pattern is specified by a zero vector and an effective vector, and wherein the PWM calculator comprises a changer configured to, when the plurality of output phase voltage commands have a changeable magnitude relationship with each other, change the switching pattern at a timing when the zero vector is being output.

12. A matrix convertor comprising:

a power convertor comprising a plurality of bidirectional switches disposed between a plurality of input phases and a plurality of output phases; and a controller configured to generate a control command and control the power convertor based on the control command, the control command comprising a switching pattern that causes a first input phase among the plurality of input phases to be connected to one output phase among the plurality of output phases and that causes connection of the plurality of input phases to be switched between a rest of the plurality of output phases, the controller being configured to, in generating the control command, set a lower limit to a period of time during which a second input phase among the plurality of input phases that corresponds to an intermediate voltage is connected to the rest of the plurality of output phases, wherein the controller comprises a command outputter configured to output an output voltage command, and a PWM calculator configured to, based on the output voltage command, calculate connection ratios of the plurality of input phases with respect to the rest of the plurality of output phases, and configured to generate the control command based on the connection ratios, wherein the PWM calculator is configured to set a connection ratio, among the connection ratios, of the second input phase at a value equal to or larger than a lower limit value, wherein the PWM calculator comprises a ratio calculator configured to, based on the output voltage command, calculate the connection ratios of the plurality of input phases with respect to the rest of the plurality of output phases, and a ratio adjustor configured to, when the connection ratio of the second input phase is smaller than the lower limit value, set the connection ratio of the second input phase at the lower limit value, and configured to adjust at least one connection ratio among a rest of the connection ratios, wherein the output voltage command comprises a plurality of output phase voltage commands, wherein the switching pattern is specified by a zero vector and an effective vector, and wherein the PWM calculator comprises a changer configured to, when the plurality of output phase voltage commands have a changeable magnitude relationship with each other, change the switching pattern at a timing when the zero vector is being output.

13. A matrix convertor comprising:
a power convertor comprising a plurality of bidirectional switches disposed between a plurality of input phases and a plurality of output phases; and
a controller configured to generate a control command and control the power convertor based on the control command, the control command comprising a switching pattern that causes a first input phase among the plurality of input phases to be connected to one output phase among the plurality of output phases and that causes connection of the plurality of input phases to be switched between a rest of the plurality of output phases, the controller being configured to, in generating the control command, set a lower limit to a period of time during which a second input phase among the plurality of input phases that corresponds to an intermediate voltage is connected to the rest of the plurality of output phases,
wherein the controller comprises
a command outputter configured to output an output voltage command, and
a PWM calculator configured to, based on the output voltage command, calculate connection ratios of the plurality of input phases with respect to the rest of the plurality of output phases, and configured to generate the control command based on the connection ratios,
wherein the PWM calculator is configured to set a connection ratio, among the connection ratios, of the second input phase at a value equal to or larger than a lower limit value,
wherein the output voltage command comprises a plurality of output phase voltage commands,
wherein the switching pattern is specified by a zero vector and an effective vector, and
wherein the PWM calculator comprises a changer configured to, when the plurality of output phase voltage commands have a changeable magnitude relationship with each other, change the switching pattern at a timing when the zero vector is being output.

14. A power generation system comprising:
a power generator configured to generate power; and
a matrix convertor connected to the power generator to output the power to a power system, the matrix convertor comprising:
a power convertor comprising a plurality of bidirectional switches disposed between a plurality of input phases and a plurality of output phases; and
a controller configured to generate a control command based on connection ratios of the plurality of input phases and control the power convertor based on the control command, the control command comprising a switching pattern that causes a first input phase among the plurality of input phases to be connected to one output phase among the plurality of output phases and that causes connection of the plurality of input phases to be switched between a rest of the plurality of output phases, the controller being configured to, in generating the control command, set a lower limit to a period of time during which a second input phase among the plurality of input phases that corresponds to an intermediate voltage is connected to the rest of the plurality of output phases,
wherein the controller includes a changer configured to change the switching pattern and an adder configured to, when the changer changes the switching pattern, add the connection ratio of the second input phase to at least one of a beginning and an end of the switching pattern.

15. A method for converting power, the method comprising:
through a power convertor comprising a plurality of bidirectional switches disposed between a plurality of input phases and a plurality of output phases, generating a control command comprising a switching pattern that causes a first input phase among the plurality of input phases to be connected to one output phase among the plurality of output phases and that causes connection of the plurality of input phases to be switched between a rest of the plurality of output phases; and
controlling the power convertor based on the control command, the control command being based on connection ratios of the plurality of input phases,
wherein the generating step comprises
setting a lower limit to a period of time during which a second input phase among the plurality of input phases that corresponds to an intermediate voltage is connected to the rest of the plurality of output phases;
changing the switching pattern; and
adding the connection ratio of the second input phase to at least one of a beginning and an end of the switching pattern.

16. A matrix convertor comprising:
a power convertor comprising a plurality of bidirectional switches disposed between a plurality of input phases and a plurality of output phases; and
controlling means for generating a control command based on connection ratios of the plurality of input phases and control the power convertor based on the control command, the control command comprising a switching pattern that causes a first input phase among the plurality of input phases to be connected to one output phase among the plurality of output phases and that causes connection of the plurality of input phases to be switched between a rest of the plurality of output phases, the controlling means setting, in generating the control command, a lower limit to a period of time during which a second input phase among the plurality of input phases that corresponds to an intermediate voltage is connected to the rest of the plurality of output phases, the control means changing the switching pattern, and when changing the switching pattern, adding a connection ratio of the second input phase to at least one of a beginning and an end of the switching pattern.

* * * * *